US 9,981,732 B2

(12) United States Patent
Goings et al.

(10) Patent No.: US 9,981,732 B2
(45) Date of Patent: May 29, 2018

(54) DOOR FOR AN AIRCRAFT

(71) Applicants: LEARJET INC., Wichita, KS (US);
C&D ZODIAC INC., Huntington Beach, CA (US)

(72) Inventors: William A. Goings, Derby, KS (US);
Eric Long, St-Lazare (CA)

(73) Assignees: LEARJET INC., Wichita, KS (US);
C&D ZODIAC, INC., Huntington Beach, CA (US)

( * ) Notice: Subject to any disclaimer, the term of this patent is extended or adjusted under 35 U.S.C. 154(b) by 147 days.

(21) Appl. No.: 14/900,973

(22) PCT Filed: Jul. 11, 2014

(86) PCT No.: PCT/US2014/046327
§ 371 (c)(1),
(2) Date: Dec. 22, 2015

(87) PCT Pub. No.: WO2015/006678
PCT Pub. Date: Jan. 15, 2015

(65) Prior Publication Data
US 2016/0144944 A1    May 26, 2016

Related U.S. Application Data

(60) Provisional application No. 61/845,562, filed on Jul. 12, 2013.

(51) Int. Cl.
*B64C 1/14*      (2006.01)
*B64D 11/00*     (2006.01)
(Continued)

(52) U.S. Cl.
CPC ............ *B64C 1/14* (2013.01); *B64D 11/0023* (2013.01); *B64D 11/02* (2013.01); *E05F 11/54* (2013.01); *E05Y 2900/502* (2013.01)

(58) Field of Classification Search
CPC .. B64C 1/14; B64C 1/32; B64C 11/02; B64D 11/0023; B64D 11/02; E05F 11/54; E05Y 2900/502; B61D 17/20; B61D 19/003
See application file for complete search history.

(56) References Cited

U.S. PATENT DOCUMENTS 2,565,383 A * 8/1951 Linebaugh .............. E06L 33/50
16/224
3,136,538 A * 6/1964 Kessner .................. E05D 3/186
49/117

(Continued)

FOREIGN PATENT DOCUMENTS

| CN | 1236348 A | 11/1999 |
| EP | 2578788 A1 | 4/2013 |
| FR | 2030583 A5 | 11/1970 |

OTHER PUBLICATIONS

International Search Report and Written Opinion dated Jan. 13, 2015 for International Patent Application No. PCT/US2014/046327.

(Continued)

*Primary Examiner* — Medhat Badawi
(74) *Attorney, Agent, or Firm* — Karceski IP Law, PLLC

(57) ABSTRACT

A door for an aircraft includes a first panel divisible into at least two first slats that are releasably connected to one another, a first tensioning cable attached between the at least two first slats, and a first tensioner connected to the first tensioning cable and being operative to apply a first tension thereto, thereby permitting the first tensioning cable to hold the at least two first slats together to form the first panel and to release the first tension in the first tensioning cable upon occurrence of a release action, thereby permitting the at least two first slats to dissociate from one another so that the first panel fragments.

19 Claims, 19 Drawing Sheets

(51) Int. Cl.
*B64D 11/02* (2006.01)
*E05F 11/54* (2006.01)

(56) References Cited

U.S. PATENT DOCUMENTS

| | | | | |
|---|---|---|---|---|
| 3,480,989 A * | 12/1969 | Edeus | ............... | E06B 3/4636 16/94 R |
| 4,375,281 A * | 3/1983 | Nichols | ............... | B64C 1/1476 244/121 |
| 4,375,876 A * | 3/1983 | Stewart | ............... | B64C 1/1438 160/201 |
| 4,597,549 A * | 7/1986 | Ryan | ............... | B64C 1/10 160/127 |
| 4,911,219 A * | 3/1990 | Dalrymple | ............... | B61D 17/20 160/118 |
| 4,989,808 A * | 2/1991 | Spraggins | ............... | B64C 1/1407 244/118.5 |
| 5,186,444 A * | 2/1993 | Palmatier | ............... | B26D 7/1818 270/21.1 |
| 5,826,824 A * | 10/1998 | Martin | ............... | B64C 1/32 244/129.3 |
| 6,027,073 A * | 2/2000 | Gratien Ferrier | ..... | B64C 1/1492 244/129.3 |
| 6,186,444 B1 * | 2/2001 | Steel | ............... | B64C 1/1423 160/118 |
| 6,341,748 B1 * | 1/2002 | Brooks | ............... | B64C 1/1407 244/129.5 |
| 6,427,383 B1 * | 8/2002 | Brooks | ............... | B64C 1/32 49/141 |
| 6,659,401 B1 * | 12/2003 | Semprini | ............... | B64C 1/1469 244/118.5 |
| 6,786,453 B2 * | 9/2004 | Jones | ............... | B64C 1/1492 244/129.3 |
| 7,252,267 B2 * | 8/2007 | Young | ............... | B64C 1/066 244/118.5 |
| 7,530,529 B2 * | 5/2009 | Bock | ............... | B64D 11/0023 244/118.5 |
| 8,038,100 B2 * | 10/2011 | Osborne | ............... | B64D 11/0023 244/129.5 |
| 8,312,681 B2 * | 11/2012 | Mouton | ............... | B64C 1/1492 52/208 |
| 8,333,036 B2 * | 12/2012 | Helms | ............... | B60J 1/085 49/141 |
| 8,449,023 B2 * | 5/2013 | Shellenberger | ............... | B60J 1/007 296/146.16 |
| 8,517,307 B2 * | 8/2013 | Saint-Jalmes | ............... | B64D 11/0023 160/102 |
| 8,672,271 B2 * | 3/2014 | Gorgoglione | ............... | B64C 1/1407 244/129.5 |
| 8,763,327 B2 * | 7/2014 | Harter | ............... | E04L 32/74 160/222 |
| 8,826,597 B2 * | 9/2014 | Raspic | ............... | B61D 19/023 244/129.3 |
| 8,833,840 B2 * | 9/2014 | Diamant | ............... | B60J 1/16 296/190.11 |
| 8,905,014 B2 * | 12/2014 | Shaffer | ............... | F24C 15/023 126/190 |
| 9,090,329 B2 * | 7/2015 | Sumner | ............... | B64C 1/1407 |
| 9,139,301 B2 * | 9/2015 | Slyter | ............... | B64D 11/0023 |
| 9,254,918 B2 * | 2/2016 | Young | ............... | B64D 11/02 |
| 9,260,175 B2 * | 2/2016 | Cabourg | ............... | B64C 1/1438 |
| 9,463,877 B2 * | 10/2016 | Ulbrich-Gasparevic | | B64D 11/0023 |
| 9,551,179 B2 * | 1/2017 | Desai | ............... | E05B 65/1033 |
| 2007/0125000 A1 * | 6/2007 | Fenelon | ............... | E05F 11/385 49/349 |
| 2009/0078824 A1 * | 3/2009 | Osborne | ............... | B64D 11/0023 244/119 |

OTHER PUBLICATIONS

Chinese Office Action dated Sep. 27, 2016, for Chinese Patent Application No. 201480039016.1.
International Preliminary Report on Patentability dated Jan. 21, 2016, for International Patent Application No. PCT/US2014/046327.

* cited by examiner

DOOR FOR AN AIRCRAFT

CROSS-REFERENCE TO RELATED APPLICATION(S)

This is a National Stage Entry into the United States Patent and Trademark Office from International Patent Application No. PCT/US2014/046327, with an international filing date of Jul. 11, 2014, and which relies for priority on U.S. Provisional Patent Application Ser. No. 61/845,562, filed on Jul. 12, 2013, the entire contents of both of which are incorporated herein by reference.

FIELD OF THE INVENTION

The present invention concerns a construction for a door positionable in an aisle of an aircraft. In particular, the present invention concerns the construction of a lavatory door that is positionable in the aisle of an aircraft and that is selectively frangible in order to facilitate access to an emergency exit in response to a qualifying event (i.e., an emergency).

DESCRIPTION OF THE RELATED ART

As should be apparent to those skilled in the art, there are numerous regulations that have been established by the United States Federal Aviation Administration ("FAA") and equivalent aviation administrations worldwide. These regulatory bodies have established a body of regulations addressing many aspects of aviation safety, including rules and regulations associated with the design and construction of the interior of aircraft.

As should be apparent to those skilled in the art, there are regulations that address the operation of doors within the cabin (i.e., the interior compartment) of the aircraft. Specifically, regulations restrict the types of doors that may be positioned within the cabin of an aircraft when the door potentially restricts access to an emergency exit from the aircraft. As a result, to comply with applicable regulations, aircraft manufacturers employ curtains when a physical divider is desired within the cabin.

U.S. Pat. No. 6,186,444 (hereinafter "the '444 Patent") describes a sliding pocket door for an aircraft that is capable of a non-destructive blow-out and easy access. The '444 Patent describes a sliding pocket door 10 having a right-hand door segment 14 and a left-hand door segment 16 that are disposable within the bulkhead 12 within the cabin of an aircraft. (The '444 Patent at col. 3, lines 1-7.) Track means 22 guide the door segments 14, 16 so that the door segments 14, 16 fit flush with a headliner 36 when the pocket door 10 is closed. (The '444 Patent at col. 4, lines 12-25.) To maintain a flush relationship with the floor 34, the door segments 14, 16 include footers 28 that adjust to the position of the door segments 14, 16. (The '444 Patent at col. 4, lines 25-34.) If there is a sudden depressurization of the cabin, the door segments 14, 16 include articulation means 20 that permit the door segments 14, 16 to rotate out of the sliding plane and drop toward the floor 34. (The '444 Patent at col. 4, lines 43-47.)

U.S. Pat. No. 4,989,808 (hereinafter "the '808 Patent"), which includes one of the same inventors from the '444 Patent, describes a similar construction for an aircraft door.

U.S. Pat. No. 4,911,219 (hereinafter "the '219 Patent") describes a pocket door for the interior of an aircraft. The '219 Patent describes a pair of sliding doors 19, 20 that close off a doorway 18 between a pair of walls 16, 17. (The '219 Patent at col. 4, lines 3-9.) The door assembly 19 includes three door members, an upper member 25, a center member 24, and a lower member 23. (The '219 Patent at col. 5, lines 5-10.) The three door members 23, 24, 25 extend from the walls 16, 17 to form the two halves of the door 19, 20.

U.S. Pat. No. 7,530,529 (hereinafter "the '529 Patent") describes a separation wall in an aircraft cabin. The wall includes two lateral separation walls 2, a central separation wall 4, an upper band 8, and two curtains 6. (The '529 Patent at col. 2, lines 26-31.) The lateral separation walls 2 further include moveable leaves 32 that provide further privacy between the cabins in the aircraft. (The '529 Patent at col. 25-32.)

U.S. Pat. No. 6,823,927 (hereinafter "the '927 Patent") describes a pocket door with a plurality of vertical seams that permit the door to fold into multiple, vertical segments. In particular, the '927 Patent describes a pocket door 10 with a sliding door panel 12 and a hinge 34 permitting first and second sections 14, 16 to fold with respect to one another. (The '927 Patent at col. 2, lines 53-64.)

In smaller aircraft, such as personal aircraft and business aircraft that are provisioned with a lavatory, it is common for aircraft manufacturers to employ a curtain to provide privacy to the occupant of the lavatory. For many reasons, a curtain is not considered to provide a sufficient level of privacy for the lavatory occupant.

It is in the context of this confluence of factors that the present invention was developed.

SUMMARY OF THE INVENTION

The present invention addresses one or more of the deficiencies noted with respect to the prior art.

The present invention provides a door for an aircraft that includes a first panel divisible into at least two first slats that are releasably connected to one another, a first tensioning cable attached between the at least two first slats, and a first tensioner connected to the first tensioning cable and being operative to apply a first tension thereto, thereby permitting the first tensioning cable to hold the at least two first slats together to form the first panel, and to release the first tension in the first tensioning cable upon occurrence of a release action, thereby permitting the at least two first slats to dissociate from one another so that the first panel fragments.

In connection with the present invention, it is contemplated that the release action may involve the application of a sufficient force to the first panel.

It is contemplated, for example, that an emergency release may be connected to the first tensioner. If so, the emergency release is contemplated to be responsive to the release action.

In one embodiment, the emergency release includes at least a cable interlock connected to a tension release cable.

In another embodiment, the emergency release includes at least a door tensioner release mechanism connected to a release cable.

The door of the present invention also may include a second panel slidably disposed adjacent to the first panel, the second panel being divisible into at least two second slats that are releasably connected to one another, a second tensioning cable attached between the two second slats, and a second tensioner connected to the second tensioning cable and being operative to apply a second tension thereto, thereby permitting the second tensioning cable to hold the at least two second slats together to form the second panel, and to release the second tension in the second tensioning cable upon occurrence of the release action, thereby permitting the at least two second slats to dissociate from one another so that the second panel fragments.

Still further, it is contemplated that the door may include a third panel slidably disposed adjacent to the first panel, the third panel being divisible into at least two second slats that are frangibly connected to one another, a third tensioning cable attached between the two second slats, and a third tensioner connected to the third tensioning cable and being operative to apply a third tension thereto, thereby permitting the third tensioning cable to hold the at least two third slats together to form the third panel, and to release the third tension in the third tensioning cable upon occurrence of the release action, thereby permitting the at least two third slats to dissociate from one another so that the third panel fragments.

In one contemplated embodiment, the at least two first slats, the at least two second slats, and the at least two third slats each have at least four slats that are disposed adjacent to one another and are vertically aligned.

In a further contemplated embodiment, the door includes a carriage connected to the first panel, and a carriage frame adapted to be disposed in a bulkhead wall, the carriage frame slidably supporting the carriage thereon so that the first panel is moveable between a stowed position within the bulkhead wall and a deployed position outside of the bulkhead wall.

It is contemplated that, when moving towards the deployed position, the second panel slides upwardly with respect to the first panel to establish a top for the door and the third panel slides downwardly with respect to the first panel to establish a bottom for the door.

Each tensioner for the door may include a housing, a cam rotatably disposed in the housing, the cam defining a cam lip, and a release rotatably disposed in the housing, the release defining a release lip. The cam lip and the release lip may be disposed to engage one another to maintain the door in an assembled condition. The cam lip and the release lip may be arranged disengage from one another upon occurrence of the release action to cause the at least two first slats to be dissociated from one another.

It is contemplated, in another embodiment, that the first tensioner may include a cable tensioner engaging the first tensioning cable, and a first biasing element connected between the housing and the cable tensioner. If so, the first biasing element may apply the first tension to the cable tensioner, which translates into the first tension on the first tensioning cable.

Separately, the first tensioner may be constructed to include a captive end attached to the first tensioning cable, the captive end engaging a detent defined in the cam and a second biasing element connected between the housing and the release, the second biasing element biasing the release into engagement with the cam.

It is also contemplated that the door may include an emergency release handle connected to the tension release cable.

The carriage may include a biasing mechanism for biasing the door in the stowed position.

The biasing mechanism may have at least one of a winding spool and a constant torque spring, for biasing the door in the stowed position.

The first panel may be stowable in a bulkhead wall in response to at least one predetermined condition. If so, the at least one predetermined condition may be selected from flight conditions and cabin conditions, among others.

According to a further embodiment of the present invention, the latch for the door may include a pressure plate, a first bolt operatively connected to the pressure plate, an intermediate plate connected to the first panel, and a first detent plate connected to the intermediate plate, the first detent plate releasably engaging the first bolt. Application of pressure to the pressure plate is contemplated to dislodge the first bolt from the first detent plate, thereby permitting the door to be deployed from a stowed position.

The present invention also is contemplated to provide a latch for a door that includes a pressure plate, a first bolt operatively connected to the pressure plate, an intermediate plate connected to the door, a first detent plate connected to the intermediate plate, the first detent plate releasably engaging the first bolt, and a second detent plate attached to the carriage. Application of pressure to the pressure plate is contemplated to dislodge the first bolt from the first detent plate, thereby permitting the door to be deployed from a stowed position within a wall. In addition, the second detent plate is contemplated to engage the first bolt when the door is in the deployed position.

The present invention also provides a method for stowing a door for an interior of an aircraft within a bulkhead, the door being located between a passenger cabin compartment and an aircraft exit, the door being positionable between a deployed position wherein the door blocks access of passengers within the passenger cabin compartment from the aircraft exit, and a stowed position wherein the door is stowed in the bulkhead and does not block access of passengers within the passenger cabin compartment from the aircraft exit. The method includes detecting that the door is in the deployed position, receiving a signal indicative of at least one predetermined condition, the predetermined condition being associated with a condition wherein the door is in the stowed position, and generating a signal causing the door to automatically move from the deployed position to the stowed position.

The present invention also provides that the method is a computer implemented method.

The signal generated may be generated in response to detection by a processor that the door is in the deployed condition and at least one predetermined condition has occurred.

Alternatively, the signal generated may be generated in response to an input from a pilot or other aircraft attendant in response to indications that the door is in the deployed condition and at least one predetermined condition has occurred.

Further aspects of the present invention will be made apparent form the paragraphs that follow.

BRIEF DESCRIPTION OF THE DRAWING(S)

The present invention will now be described in connection with the drawings appended hereto, in which.

DETAILED DESCRIPTION OF EMBODIMENT(S) OF THE INVENTION

The present invention will now be described in connection with one or more embodiments thereof. The discussion of the embodiments is not intended to be limiting of the present invention. To the contrary, any discussion of embodiments is intended to exemplify the breadth and scope of the present invention. As should be apparent to those skilled in the art, variations and equivalents of the embodiment(s) described herein may be employed without departing from the scope of the present invention. Those variations and equivalents are intended to be encompassed by the scope of the present patent application.

The present invention will now be discussed in the context of the construction of a jet aircraft where one or more jet engines (also referred to as turbine engines or turbofan engines) are affixed (or attached) to the fuselage of the aircraft. While the invention is discussed in this context, the present invention is not intended to be limited solely to the construction of aircraft with jet engines. It is contemplated that the present invention may be employed in connection with other type of aircraft, as should be apparent to those skilled in the art.

With respect to the discussion that follows, it is noted that specific directional conventions are assumed to be known to those skilled in the art. The directional conventions are consistent with the forward travel direction of the aircraft. In this context, the term "forward" (or its equivalent) refers to the front end (or nose) of the aircraft. The term "rear" (or its equivalent) refers to the aft end (back end or tail) of the aircraft. The term "right side" (or its equivalent) refers to the right side (or starboard side) of the aircraft as defined by the forward and aft ends of the aircraft. The term "left side" (or its equivalent) refers to the left side (or port side) of the aircraft, also as defined by the fore and aft ends thereof.

Additionally, the term "longitudinal" refers to the longitudinal direction of the aircraft that extends from the front end to the rear end of the aircraft. The term "lateral" refers to the lateral direction of the aircraft that extends from the right side to the left side of the aircraft (i.e., as defined by the aircraft's wingspan). As should be apparent, the lateral direction is orthogonal to the longitudinal direction. The terms "up" (or top) and "down" (or bottom) refer to a vertical direction or orientation of the aircraft when the aircraft is parked on the ground.

Figure 1:
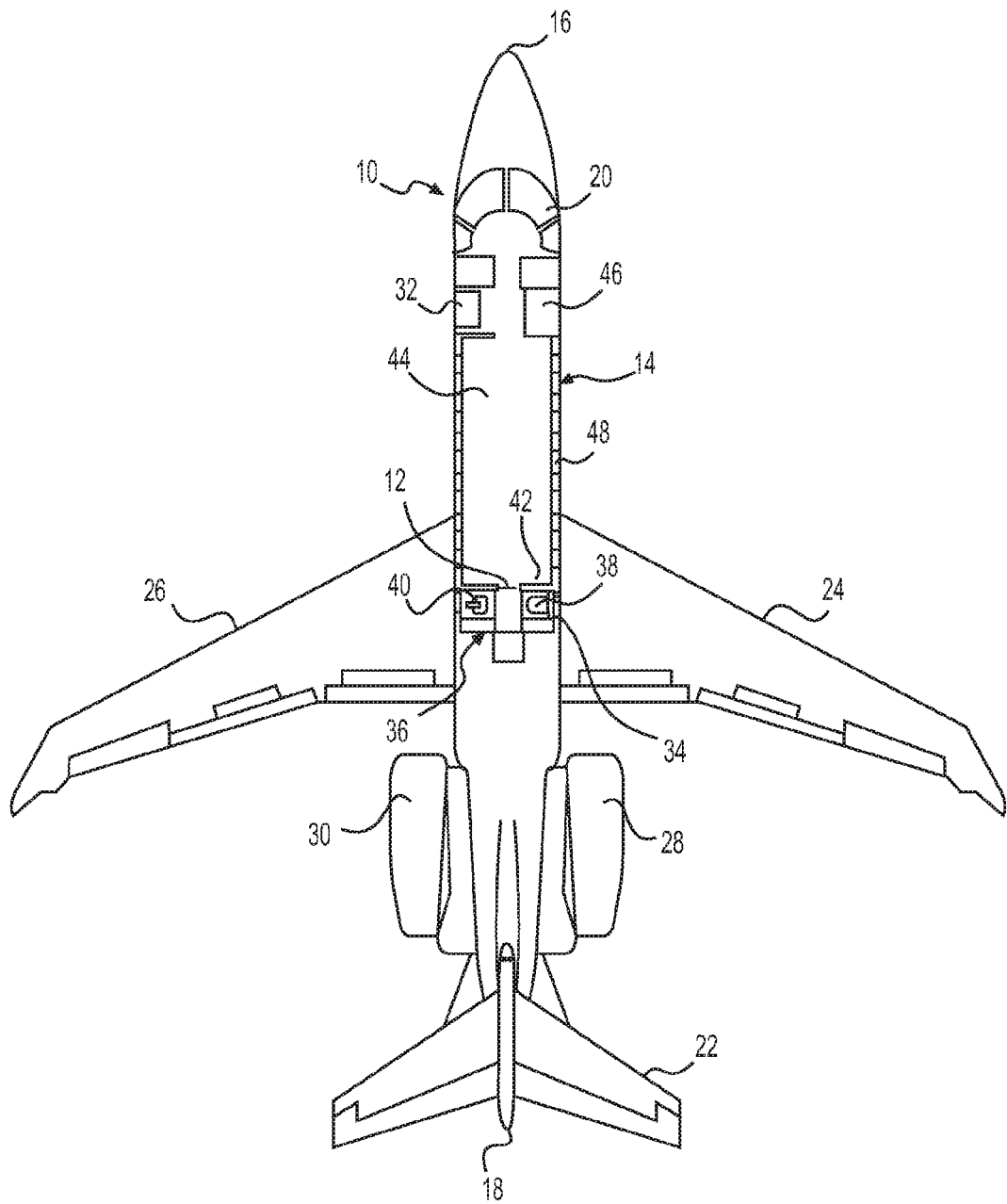
FIG. 1 is a graphical, top view of an example of a style of aircraft that may be provisioned with the lavatory door of the present invention.

FIG. 1 is a perspective illustration of an aircraft 10 that may be configured to incorporate the frangible lavatory door 12 of the present invention. While the present invention is discussed in the context of a door 12 for a lavatory, the door 12 of the present invention is not intended to be limited to any particular environment. To the contrary, the door 12 may be employed at any location within the aircraft 10 without departing from the scope of the present invention. Therefore, while the door 12 is referred to as a "lavatory door 12" in the discussion that follows, the stated use is not intended to limit the scope of the present invention in any way.

Returning to FIG. 1, the aircraft 10 includes a fuselage 14 that extends from a front end 16 to a rear end 18. The front (nose or forward) end 16 includes a cockpit 20. The rear (tail or aft) end 18 includes the tail section (or empennage) 22 of the aircraft 10. Right (or starboard) and left (or port) wings 24, 26 extend from the fuselage 14. Right and left engines 28, 30 are attached to the fuselage 14, ahead of the tail section 22. As should be apparent to those skilled in the art, the wings 24, 26 and tail section 22 include various control surfaces that control the flight trajectory of the aircraft 10.

As should be apparent from FIG. 1, the lavatory door 12 of the present invention is positioned on an aircraft 10 that is typically referred to as a private jet or a business jet. These aircraft 10 typically are used for private purposes and carry a modest number of passengers. While the door 12 of the present invention is described in this context, it is noted that the door 12 may be employed in any other type of aircraft, such as a commercial aircraft, or in any other location on board an aircraft. In addition, it is contemplated that the door 12 of the present invention may be employed on other vehicle types, such as boats, railway cars, recreational vehicles, busses, etc., without departing from the scope of the present invention.

With continued reference to FIG. 1, the aircraft 10 includes a main door 32 behind the cockpit 20. The main door 32 is the doorway through which passengers enter and exit the aircraft 10 under normal operating conditions. The aircraft 10 also is contemplated to include at least one emergency exit door 34. In the illustrated embodiment, the emergency exit door 34 is positioned towards the rear end 18 of the aircraft 10, within the lavatory 36. The lavatory 36 includes a commode 38 and a sink 40 in the illustrated embodiment. The lavatory 36 is separated from the main cabin area by a bulkhead 42. The door 12 is provided in the bulkhead 42.

For reference, the aircraft 10 includes a central aisle 44 that extends from the main door 32 towards the rear end 18 of the aircraft 10. A galley area 46 is located opposite to the main door 32. Passenger seating (not shown) is contemplated to be positioned on either side of the aisle 44, adjacent to the windows 48. Accordingly, in the non-limiting aircraft configuration shown in FIG. 1, the door 12 separates the area in which the passenger seating is found from the emergency exit door 34.

Figure 2:
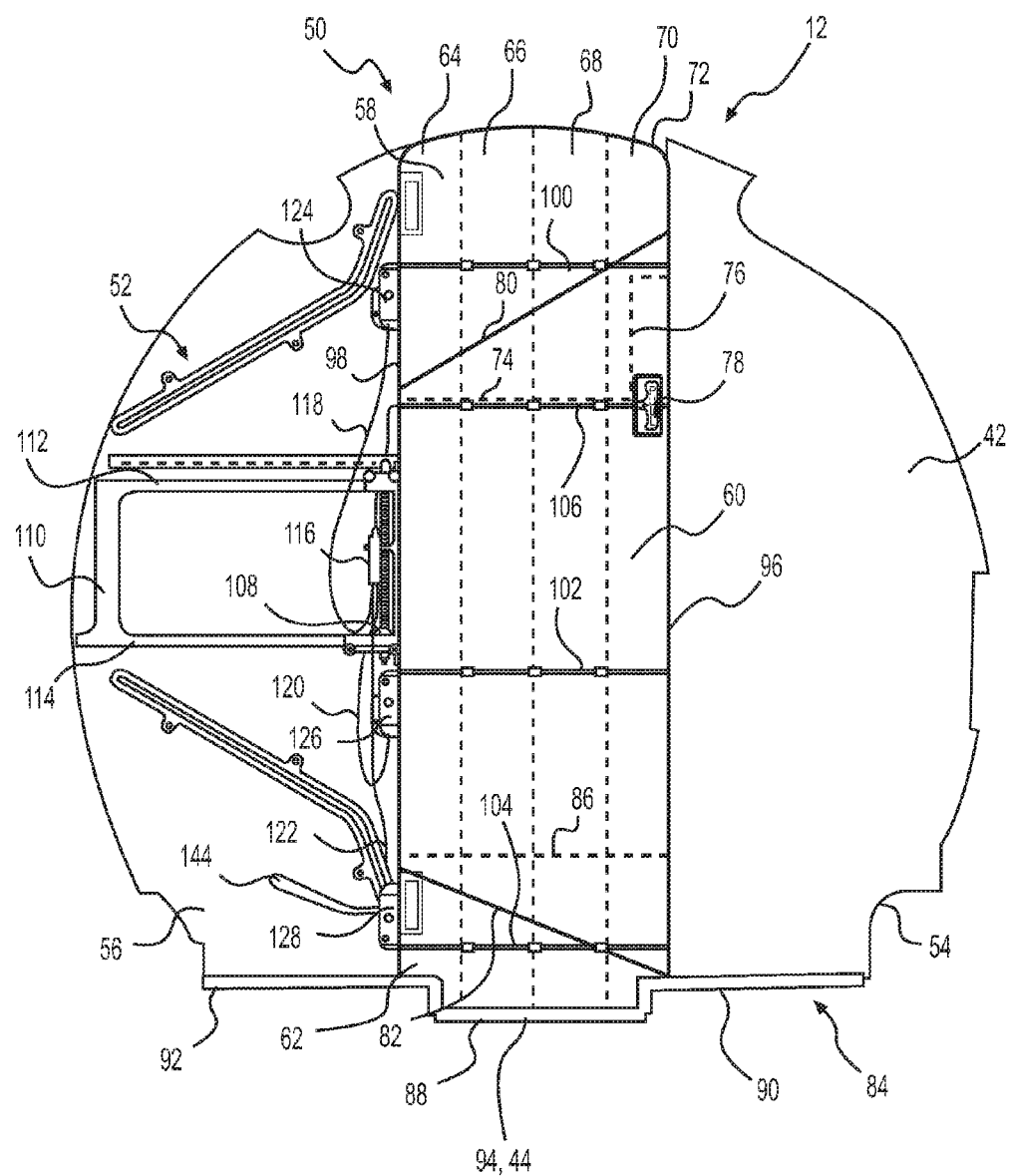
FIG. 2 is a front, elevational view of a first contemplated embodiment of the lavatory door of the present invention, also showing aspects of the mechanisms associated therewith, the lavatory door being illustrated in a deployed, assembled condition.

FIG. 2 is a front, elevational view of the door 12 of the present invention. The door 12 includes two basic components: (1) a frangible door element 50 and (2) a mechanism 52 that is responsible for the deployment and stowage of the door element 50. The bulkhead 42 includes both a right bulkhead wall 54 and a left bulkhead wall 56. In the example shown, the mechanism 52 is disposed within the left bulkhead wall 56.

It is noted that one aspect of the door 12 of the present invention lies in the construction whereby the entirety of the door element 50 is stowed in only one of the two bulkhead walls 54, 56. As a result, the door element 50 is deployed from only one of the two bulkhead walls 54, 56. With this construction, it becomes possible to house the mechanism 52 within one bulkhead wall, such as the left bulkhead wall 56 depicted in the drawings.

Before discussing the mechanism 52, an overview of the construction of the frangible door element 50 is provided.

The door element 50 includes three separate panels 58, 60, 62. Each of the panels 58, 60, 62 includes four vertically-oriented slats 64, 66, 68, 70. Accordingly, the door element 50 includes a total of twelve separate segments that are connected to one another.

While the door element 50 is described in connection with an embodiment that includes three panels 58, 60, 62 and four slats 64, 66, 68, 70, the door 50 of the present invention is not intended to be limited solely to this construction. The door may include a fewer or a larger number of panels 58, 60, 62. In addition, the door may include a fewer or larger number of slats 64, 66, 68, 70. The sheer number of possible options in this regard underscores the breadth of the present invention.

Concerning the construction of the slats 64, 66, 68, 70 themselves, any suitable material may be employed. For example, the slats 64, 66, 68, 70 may be made from plastic, metal, composite materials, wood, particle board, cardboard, and the like. While it is contemplated that the slats 64, 66, 68, 70 will be made from the same materials, the composition of individual slats 64, 66, 68, 70 may differ from one another as required or as desired.

The top panel 58 of the door element 50 defines the top of the door element 50 and includes a curved top end 72, which is designed to mate with the curved interior of the ceiling of the aircraft 10. The top panel 58 has a straight bottom edge 74. In the illustrated embodiment, the top panel 58 includes a cutout 76, which permits the top panel 58 to slide relative to the emergency release handle 78 when moving between the deployed and stowed position, as will be discussed in more detail below. As such, the top panel 58 essentially has a rectangular shape with a curved top edge 72.

The center panel 60 of the door element 50 is trapezoidally shaped. The top edge 80 defines a diagonal line above the emergency release handle 78. The bottom edge 82 defines a diagonal line above the floor 84 of the cabin of the aircraft 10. The diagonal line of the top edge 80 and the diagonal line of the bottom edge 82 diverge away from each other moving from the left bulkhead 56 to the right bulkhead 54.

The bottom panel 62 also is essentially rectangularly shaped. The top edge 86 is above the bottom edge 82 of the central panel 60 when the door 50 is deployed. The bottom edge 88 has a generally U-shape, which accommodates the shape of the floor 84.

As should be apparent from the drawings, the top panel 58 overlaps the center panel 60. Similarly, the bottom panel 62 overlaps the center panel 60. The overlapped regions between the panels 58, 60, 62 ensure that the door 50 presents a continuous barrier to close off the lavatory 36 and provide sufficient privacy when in use. As may be apparent, the panels 58, 60, 62 need not overlap one another when the door 50 is in the deployed position. Some overlap, however, is contemplated to be necessary to ensure adequate privacy.

Concerning the floor 84, it is noted that the floor 84 includes right and left raised floor surfaces 90, 92. The right and left floor surfaces 90, 92 are contemplated to be at the same height. The central floor surface 94 is slightly lower (in height) than the right and left floor surfaces 90, 92 to provide passengers with a little extra headroom when standing in the aisle 44 of the aircraft 10. The bottom panel 62 of the door 50 is shaped to accommodate this height difference in the floor 84. As should be apparent, the bottom panel 62 would not need to have a U-shaped bottom edge 88 if the floor 84 is planar from edge to edge.

As will be discussed in greater detail below, the top panel 58 slides vertically with respect to the center panel 60 as the door 12 moves between the deployed and stowed positions. Similarly, the bottom panel 62 slides vertically with respect to the center panel 60 as the door 12 moves between the deployed and stowed positions. As such, the top panel 58 may slide downwardly and the bottom panel 62 may slide upwardly so that the door may be stowed in the left bulkhead wall 56.

Concerning the sliding engagement of the top panel 58 with respect to the center panel 60 and the sliding arrangement of the bottom panel 62 with respect to the center panel 60, the manner in which the panels 58, 60, 62 are slidingly connected to one another is not critical to the present invention. As should be apparent to those skilled in the art, there are numerous possible ways in which the panels 58, 60, 62 may be disposed in relation to one another to provide the sliding engagement discussed and illustrated herein.

In the embodiment illustrated in FIG. 2, it is contemplated that the door 50 will include a track 96 at the right side thereof. The track 96 (possibly constructed as a frame element) is contemplated to include two or more grooves to accommodate the slats 70 that are adjacent thereto. The slats 70 slidingly engage the track 96 to permit the panels 58, 60, 62 to move therealong. It is also possible that a track 98 may be provided on the left side of the door 50. However, the track 98 on the left side will be limited by the height of the space available in the left bulkhead 56 when the door 50 is stowed therein.

Alternatively, the door 50 may exclude a right track 96 and a left track 98. The door is contemplated to be operated from only the left bulkhead 56, where the door 50 is stowed. The door 50, in one embodiment, is not intended to touch, latch or contact the right bulkhead 54. This allows the door 50 to swing or bend in either axis. This helps with the egress from either side, which makes the door 50 particularly suitable for the aircraft 10.

To hold the slats 64, 66, 68, 70 together to form the panels 58, 60, 62, the door element 50 includes three tensioning cables 100, 102, 104. The top tensioning cable 100 connects the slats 64, 66, 68 70 that form the top panel 58. The center tensioning cable 102 connects the slats 64, 66, 68, 70 that form the center panel 60. The bottom tensioning cable 104 connects the slats 64, 66, 68, 70 that form the bottom panel. The tensioning cables 100, 102, 104 apply sufficient tension to the slats 64, 66, 68, 70 to keep the slats 64, 66, 68, 70 connected together to form the panels 58, 60, 62.

While the illustrated embodiment of the door 50 includes three tensioning cables 100, 102, 104 (one per panel 58, 60, 62), it is contemplated that a larger number of tensioning cables 100, 102, 104 may be employed for each panel 58, 60, 62. In one contemplated alternative, for example, each panel 58, 60, 62 may include two tensioning cables 100, 102, 104. It is contemplated that the number of tensioning cables 100, 102, 104 will depend on the size and shape of the door 50. It is also contemplated that the number of cables 100, 102, 104 may be dependent upon the materials that are selected for the slats 64, 66, 68, 70.

Figure 3:
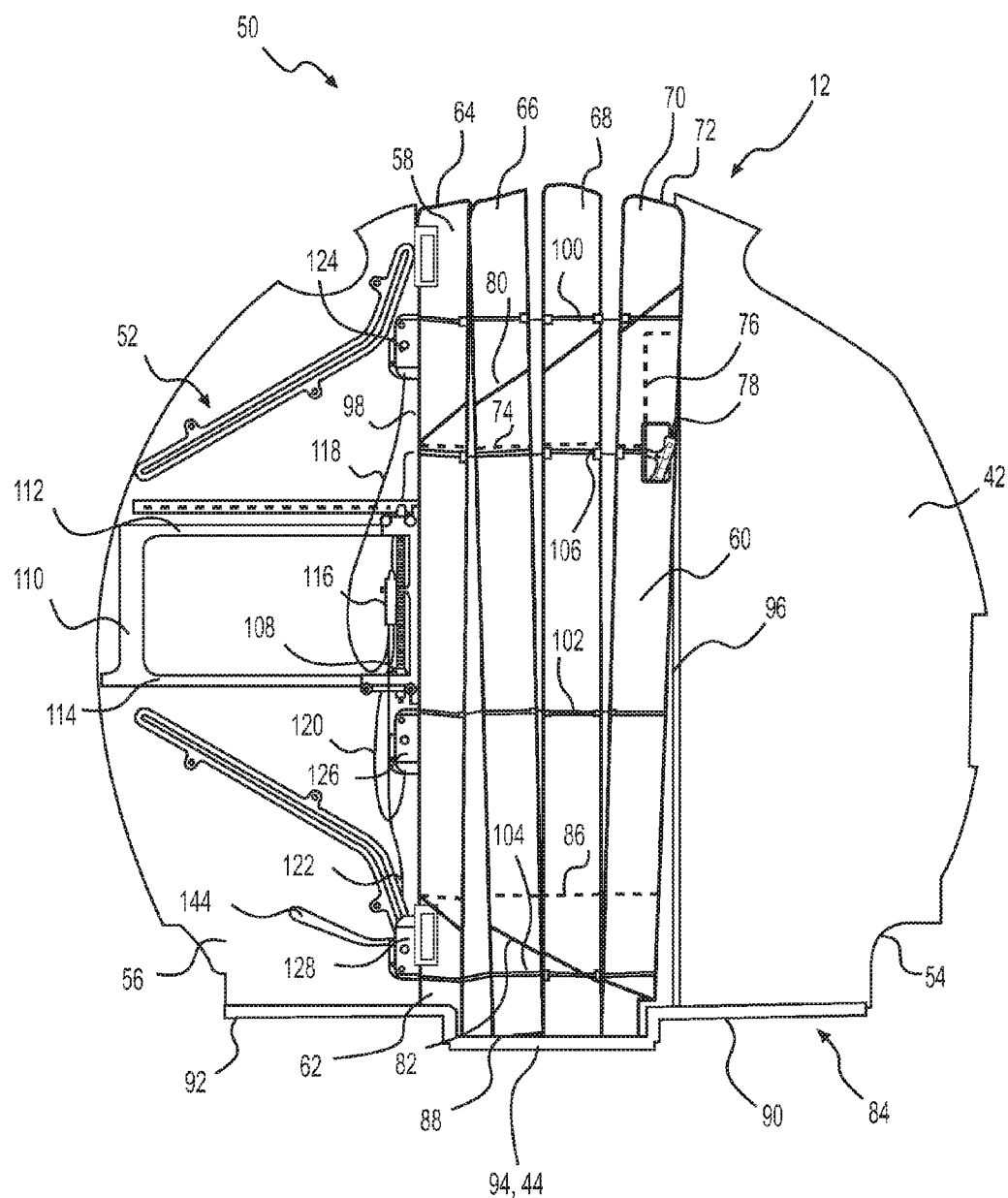
FIG. 3 is a front, elevational view of the lavatory door illustrated in FIG. 2, showing the lavatory door in a deployed, fragmented condition.

As illustrated in FIG. 3, by releasing the tensioning cables 100, 102, 104, the panels 58, 60, 62 may be non-destructively fragmented, such that the door 12 is frangible for providing access to an emergency exit. Specifically, the panels 58, 60, 62 may be non-destructively fragmented along the dividing lines associated with the slats 64, 66, 68, 70. As indicated in FIG. 3, the slats are contemplated to remain vertically cohesive. In other words, the slats 64, 66, 68, 70 are not contemplated to fragment into smaller segments.

The slats 64, 66, 68, 70 are contemplated to connect with one another via a slot and tab arrangement such that they are frangibly connected to one another. While a slot and tab arrangement is contemplated with respect to the illustrated embodiment of the door 50, other connecting arrangements between the slats 64, 66, 68, 70 are contemplated to fall within the scope of the present invention. For example, the slats 64, 66, 68, 70 may abut against one another be presenting smooth, adjacent surfaces. In another example, the slats 64, 66, 68, 70 may include magnets, such as rare earth magnets, that help to hold the slats in close proximity to one another. Still other connecting arrangements should be apparent to those skilled in the art and are contemplated to fall within the scope of the present invention.

With continued reference to FIGS. 2 and 3, various parts of the mechanism 52 are visible. The mechanism 52 controls the stowage and deployment of the door element 50 from the left bulkhead wall 56.

The mechanism 52 includes a carriage 108 that is mounted in the left bulkhead wall 56. The carriage 108 connects to at least to the central panel 60. The carriage 108 rides on a rail frame 110 that includes an upper rail 112 and a lower rail 114. The carriage frame 110 supports a cable interlock 116 that is connected to the emergency release handle 78 and three cables 118, 120, 122. The cables 118, 120, 122, in turn, are connected to cable tensioners 124, 126, 128. A lever 144 is associated with the lower cable tensioner 128. In an alternative embodiment described below, the frangible door 50 does not include an emergency release handle 78.

Figure 4:
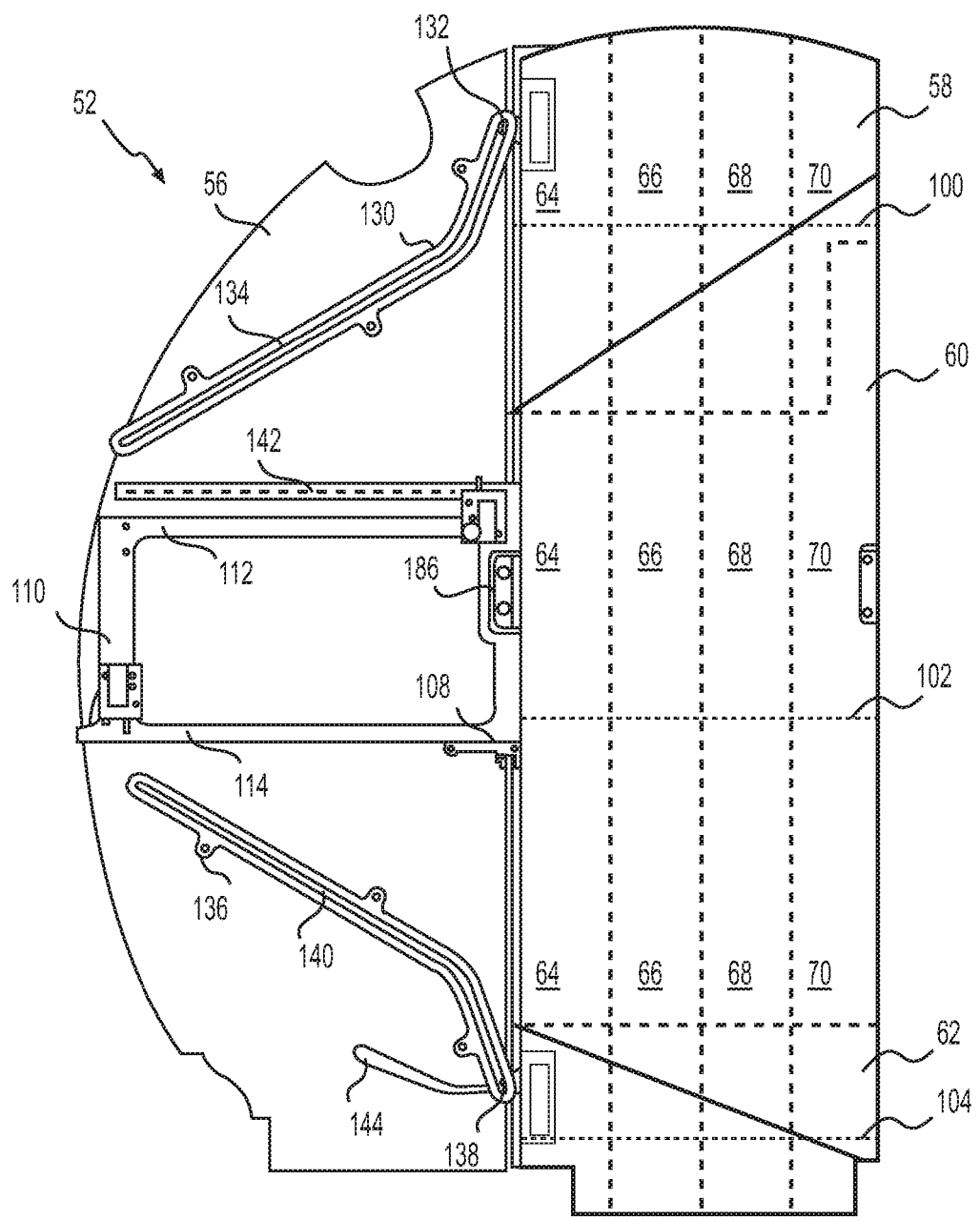
FIG. 4 is a front, elevational view of the lavatory door illustrated in FIG. 2, showing the lavatory door in a deployed, assembled condition, providing additional detail concerning the mechanisms associated with the operation of the lavatory door.
Figure 5:
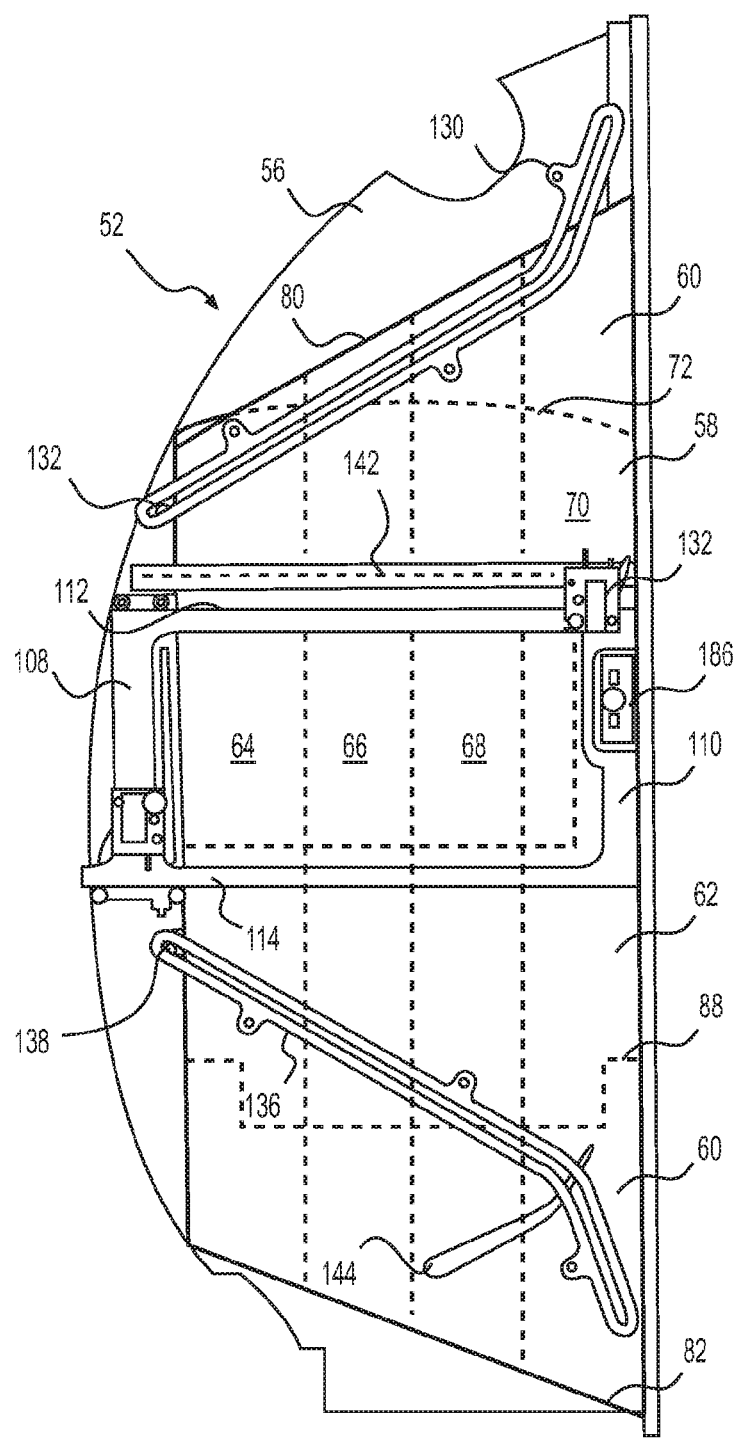
FIG. 5 is a front, elevational view of the lavatory door illustrated in FIG. 2, showing the lavatory door in a stowed, assembled condition.

For purposes of describing the stowage and deployment of the door element 50 from the left bulkhead wall 56, reference is now made to FIGS. 4 and 5. To simplify the discussion, the cable interlock 116, cables 118, 120, 122, and cable tensioners 124, 126, 128 have been omitted from FIGS. 4 and 5. As should be apparent, FIG. 4 illustrates the door element 50 in a deployed position. FIG. 5 illustrates the door element 50 in a stowed position.

In the deployed position, as illustrated in FIG. 4, the carriage 108 is positioned at the right side of the carriage frame 110. The top panel 58 is extended to abut against, or be positioned in proximity to, the ceiling of the cabin of the aircraft 10. The bottom panel 62 is extended to abut against, or be positioned in proximity to, the floor 84 of the cabin of the aircraft. The tensioning cables 100, 102, 104 are under tension, thereby holding the slats 64, 66, 68, 70 together to form the door element 50.

FIG. 4 illustrates that the mechanism 52 includes an upper track 130 that movably connects to the upper panel 58 via an upper guide member 132. The upper track 130 extends from one side of the left bulkhead wall 56 to the other, above the rail frame 110. The upper guide member 132 travels within an upper groove 134 in the upper track 130. The upper track 130 assists with the movement of the upper panel 58 when the door element 50 transitions from the deployed position illustrated in FIG. 4 to the stowed position illustrated in FIG. 5.

As also shown in FIG. 4, the mechanism 52 includes a lower track 136. The lower track 136 movably connects to the lower panel 62 via a lower guide member 138. The lower guide member 138 travels in a lower groove 140 defined in the lower track 136. The lower track 136 helps to guide the movement of the lower panel 62 during the transition of the door element 50 from the deployed position to the retracted position.

The mechanism 52 also includes a winding track 142, which is positioned above and adjacent to the carriage frame 110. The winding track 142 parallels the upper rail 112. As discussed in greater detail in connection with FIG. 6, the winding track 142 cooperates with the carriage 108 to provide a bias to the carriage 108. In particular, the winding track 142 helps to bias the door element 50 into the stowed position, as illustrated in FIG. 5.

With continued reference to FIG. 4, the mechanism 52 includes a lifting lever 144. The lifting lever 144 is disposed beneath the lower track 136. The distal end of the lifting lever 144 is shown in contact with the lower guide member 138, beneath the lower guide member 138. The lifting lever 144 is contemplated to provide lift to the lower panel 62 to assist the lower panel 62 to retract so that the door element 50 may retract to the stowed position illustrated in FIG. 5. The lifting lever 144 is provided because, among other reasons, the lower panel 62 must be raised to lift the bottom part of the lower panel 62 from the aisle 44.

In the stowed position, which is illustrated in FIG. 5, the carriage 108 is positioned at the left side of the carriage frame 110. The top panel 58 has transitioned to a lower height and the lower panel 62 has moved upward from the deployed position. As should be apparent from this illustration, the collapsed condition of the door element 50 is necessary due to the height restriction in the interior cabin of the aircraft 10.

Figure 6:
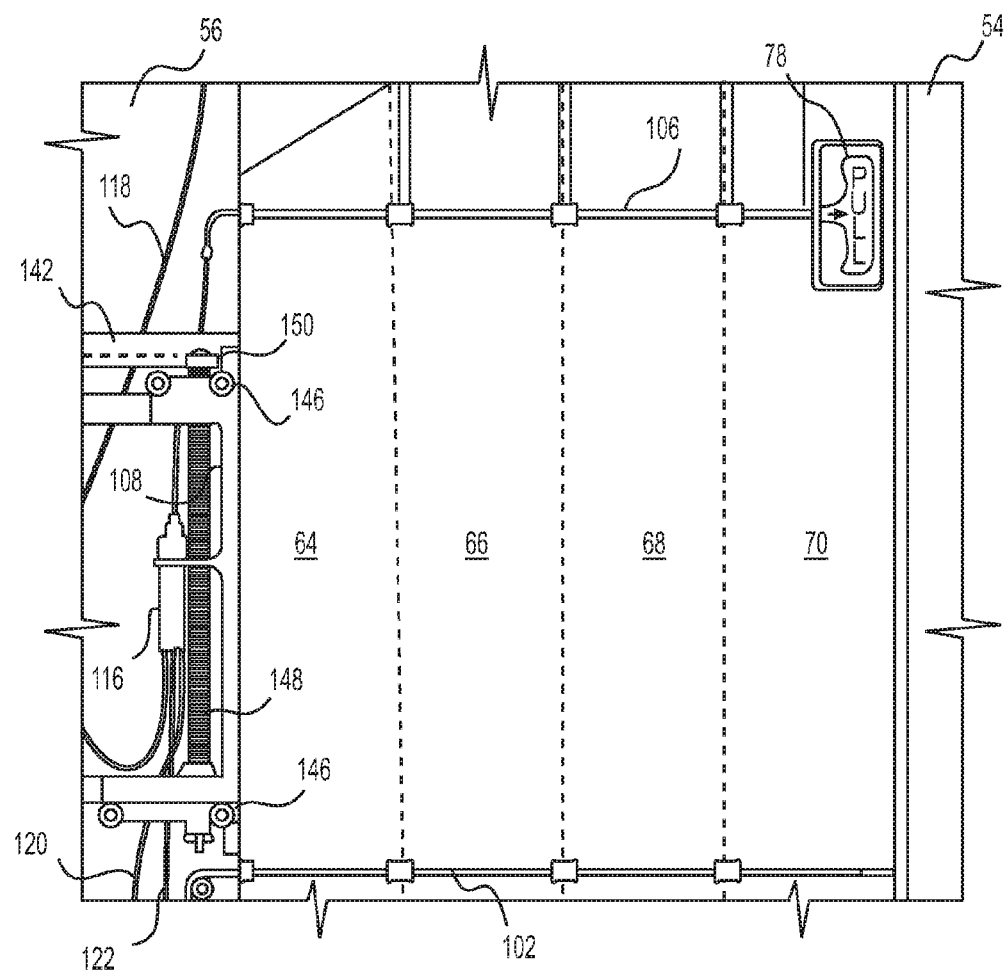
FIG. 6 is a front, elevational view of a portion of the mechanism associated with the operation of the lavatory door illustrated in FIG. 2.

FIG. 6 is an enlarged, elevational view of a portion of the door element 50 and mechanism 52. The carriage 108 is illustrated at the left side of the illustration. The emergency release handle 78, which in the embodiment shown comprises a handle, connects to an emergency tension release cable 106. The emergency tension release cable 106 connects to a cable interlock 116. The cable interlock 116, in turn, connects to the three cables 118, 120, 122 that connect to the cable tensioners 124, 126, 128. Together, the emergency tension release cable 106 and the cable interlock 116 can be considered an emergency release, wherein upon occurrence of a release action (such as pulling of the emergency release handle 78), the emergency release is operative for causing the tensioner cable tensioners 124, 126, 128 to release the tension in the tensioning cables 100, 102, 104. In an alternative embodiment where there is no emergency release handle 78, the release action may be a certain amount of pressure applied to the door 50, such that the emergency tension release cable 106 and the cable interlock 116 cause the tension in the tensioning cables 100, 102, 104 to be released.

While the drawings illustrate the emergency release handle (or actuator) 78 as a graspable handle, it is contemplated that the door 50 of the present invention may incorporate any number of different mechanisms for the emergency release handle 78. For example, the emergency release handle 78 may be a button that is depressed. The emergency release handle 78 could be a lever or knob that is rotated from an initial position. Still further, the emergency release handle 78 may be a pull cord. It is also contemplated that the door 50 may not include an emergency release handle 78 at all, and the cables 100, 102, 104 may simply be configured to release their tension when a sufficient force is applied to the door 50, as described in connection with the lavatory door 220. In other words, the fact that the emergency release handle 78 is illustrated as a handle should not be understood to be limiting of the present invention.

When the door element 50 is in the deployed position, the emergency release handle 78 is accessible by a passenger adjacent to the door. When the passenger pulls the emergency release handle 78, the passenger transmits a cable release signal to the cable interlock 116. The cable interlock 116 transmits this same signal to each of the cable tensioners 124, 126, 128. The cable tensioners 124, 126, 128, in turn, release the tension on the tensioning cables 100, 102, 104. Once the tension is released from the tensioning cables 100, 102, 104, the slats 64, 66, 68, 70 are free to move with respect to one another. As a result, the door element 50 is permitted to fragment, freeing the aisle 44 for access to the emergency exit 34 adjacent to the lavatory 36. In other words, the slats 64, 66, 68, 70 are permitted to dissociate from one another in this emergency condition of the door 50.

In the various illustrations, the emergency release handle 78 is illustrated as being on the side of the door 50 that is within the interior of the lavatory 36. While this positioning is contemplated for the emergency release handle 78, the emergency release handle 78 may be positioned on the exterior side of the door 50. Still further, separate emergency release handles 78 may be provided on both sides of the door 50 so that passengers may fragment the door from either side. Where an emergency release handle 78 is provided on both sides of the door 50, the emergency release handles 78 need not be identical. It is contemplated, for example, that the emergency release handle 78 on the interior side of the door 50 may be a handle and the emergency release handle 78 of the exterior of the door may be a button.

As should be apparent, the mechanism 52 is contemplated to operate entirely based on mechanical motion. As such, the mechanism 52 does not require any electrical input or depend upon external power for its operation. While this arrangement is preferred, because the mechanism 52 will operate even under conditions where there is a temporary loss of power in the aircraft 10, the mechanism may be constructed to operate with electrical power, at least in part, without departing from the scope of the present invention.

With continued reference to FIG. 6, the carriage 108 includes several wheels 146 that facilitate movement of the carriage 108 on the carriage frame 110. Moreover, the wheels 146 also help to secure the carriage 108 onto the carriage frame 110.

The carriage 108 also includes a winding spool 148 disposed thereon, that acts as a biasing mechanism for biasing the door 50 in the stowed position. The winding spool 148 includes a roller 150 at a top end thereof. The roller 150 engages the winding track 142. The roller 150 may engage the winding track 142 via any suitable engagement. For example, the roller 150 may be provided with an elastomeric surface (e.g., a rubber coating or other, suitable, damping coating) that may engage the winding track 142 via friction. Alternatively, the roller 150 may be styled as a sprocket or gear with a toothed outer surface. Similarly, the surface of the winding track 142 may present a complimentary surface configuration.

The winding track 142 and the roller 150 cooperate with one another so that the winding spool 148 may be tensioned to bias the door element 50 into the stowed position. In this regard, it is contemplated that the winding spool 148 may include a spring (or other suitable tensioning element) that stores energy when the door element 50 transitions from the stowed position to the deployed position. Specifically, as the passenger opens the door 50, the passenger pulls on the door element 50. In so doing, the passenger tensions the biasing element (i.e., the winding spool 148) so that the door element 50 is pre-tensioned to return to the stowed position at the time that the door element 50 is opened. In other words, the door element 50 is biased to retract into the left bulkhead wall 56.

Figure 7:
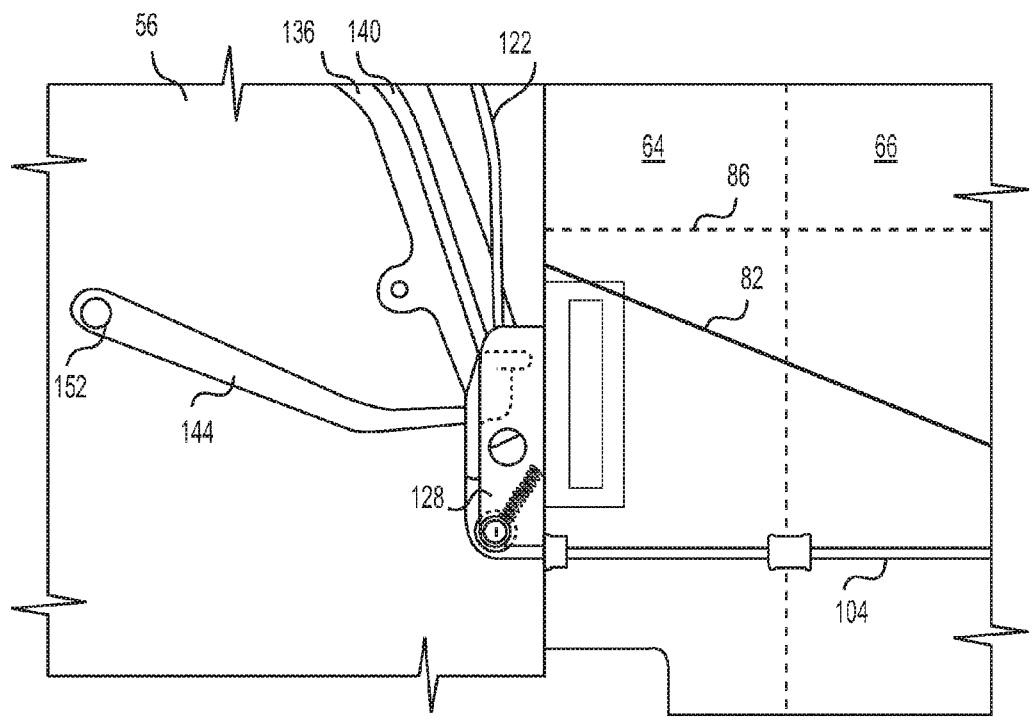
FIG. 7 is a front, elevational view of another portion of the mechanism associated with the operation of the lavatory door illustrated in FIG. 2.

FIG. 7 provides a front, elevational view of the lower section of the mechanism 52 associated with the door element 50 of the present invention. Specifically, in this view, the lifting lever 144 and the lower cable tensioner 128 are visible. As should be apparent, the door element 50 is in the deployed position. The lever pivot 152 is visible in this view. As should be apparent from the drawings and the discussion herein, the lifting lever 144 pivots around the lever pivot 152. So that the lifting lever 144 is capable of lifting the bottom panel 62 when the door 50 is opened, the lifting lever 144 may be appropriately biased via a spring or other suitable biasing element. As noted above, it is contemplated that the mechanism 52 of the present invention will operate in an unpowered mode. Alternatively, the operation of the lifting lever 144 may be powered, as should be apparent to those skilled in the art.

Figure 8:
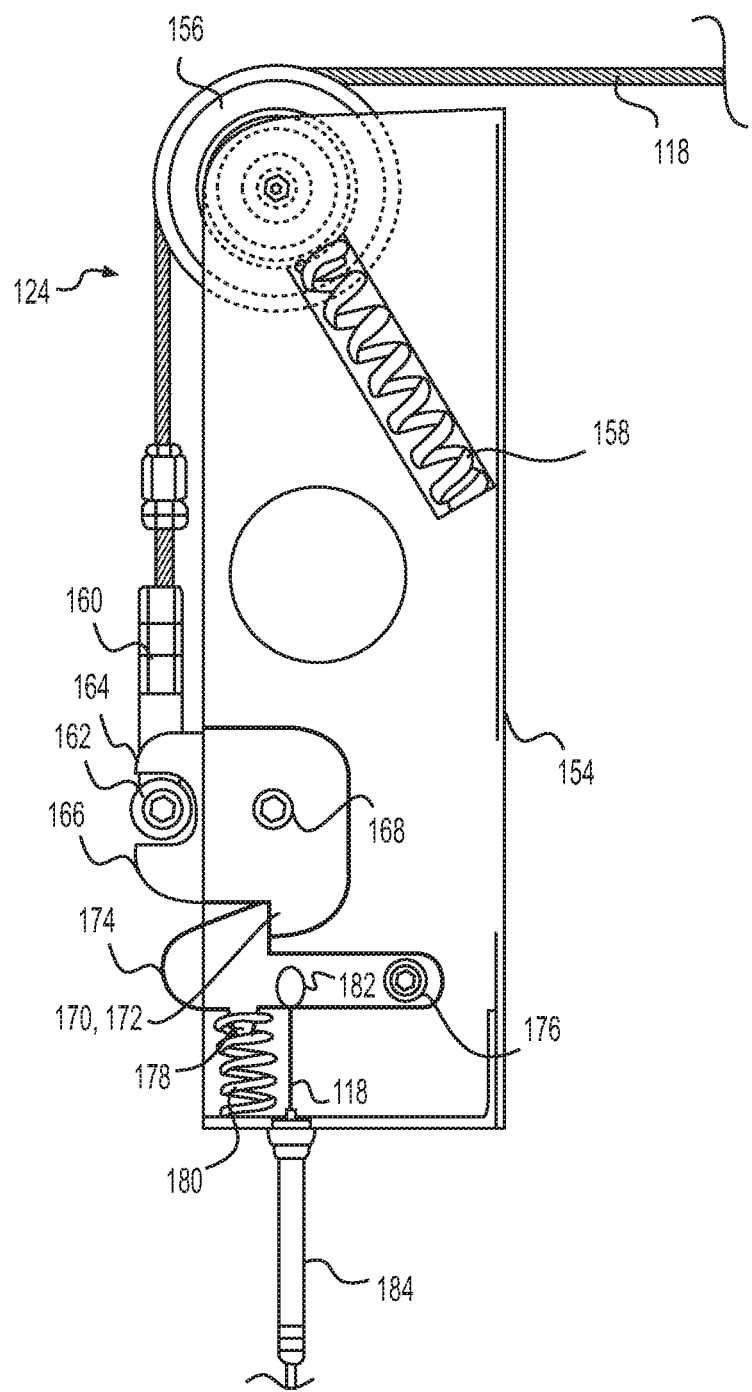
FIG. 8 is a front, elevational view of still another portion of the mechanism associated with the operation of the lavatory door illustrated in FIG. 2.

FIG. 8 is an enlarged, elevational view of the upper cable tensioner 124 in accordance with the present invention. The discussion of the operation of the upper cable tensioner 124 is applicable to the center cable tensioner 126 and the lower cable tensioner 128. Accordingly, discussion of the center cable tensioner 126 and the lower cable tensioner 128 are omitted from the discussion that follows.

The upper cable tensioner 124 includes a housing 154, which is contemplated to be mounted adjacent to the slat 64, as illustrated in FIGS. 1-7. The housing 154 is illustrated as a rectangular body and is considered to be made from a material such as aluminum. As should be apparent to those skilled in the art, however, that housing 154 may be made to have any suitable shape and to be made from any suitable material without departing from the scope of the present invention.

The top tensioning cable 100 extends from the top panel 58 and engages a pulley 156 that is moveably disposed with respect to the housing 154. In particular, the pulley 156 is biased by a spring 158 that is disposed within the housing 154. The spring 158 provides tension on the cable 100 and permits some variation on the disposition of the cable 100. In particular, it is contemplated that a passenger may apply pressure to the door element 50 when the door is deployed. If so, to maintain the integrity of the door 50, the upper cable 100 is permitted to move to accommodate the pressure applied thereon. The pulley 156 and spring 158 are provided to enhance the flexibility of the door 50.

As illustrated in FIG. 8, the top cable 100 wraps around the pulley 156 and terminates at an adjustable tensioner 160. The tensioner 160 includes a captive end 162 that engages a detent 164 in a cam 166 that rotates around a cam axis 168. The cam 166 includes a lip 170 that engages a lip 172 on a release 174 that abuts against the cam 166. The release rotates about a release axis 176. The release includes a protrusion 178 that engages a spring 180. The spring 180 applies pressure to the release 174 to bias the release 174 into engagement with the cam 166. The upper cable 118, which is responsible for releasing the upper cable 100 so that the door 50 may fragment, connects to the release 174 at connection point 182. The upper cable 118 is shown being threaded through a connector 184 that connects to the housing 154.

In connection with the cable tensioners 124, 126, 128, it is noted that the foregoing discussion identifies two springs 158, 180. While coil springs 158, 180 are illustrated, any alternative biasing member may be employed without departing from the scope of the present invention.

As should be apparent from FIG. 8, when a passenger pulls on the emergency release handle 78, the upper cable 118 pulls on the release 174, which moves against the bias applied by the spring 180. After the release has moved a sufficient amount, the lips 170, 172 disengage from one another. This permits the cam 166 to rotate clockwise, releasing the captive end 162 from the detent 164. As a result of this operation, tension is released from the cable 100, thereby permitting the door to fragment.

To reassemble the door 50, all that is required is for the slats 64, 66, 68, 70 to be reconnected to one another and the captive end 162 to be returned to the detent 164.

As noted above, each of the cable tensioners 124, 126, 128 are contemplated to operate in the same manner.

Figure 9:
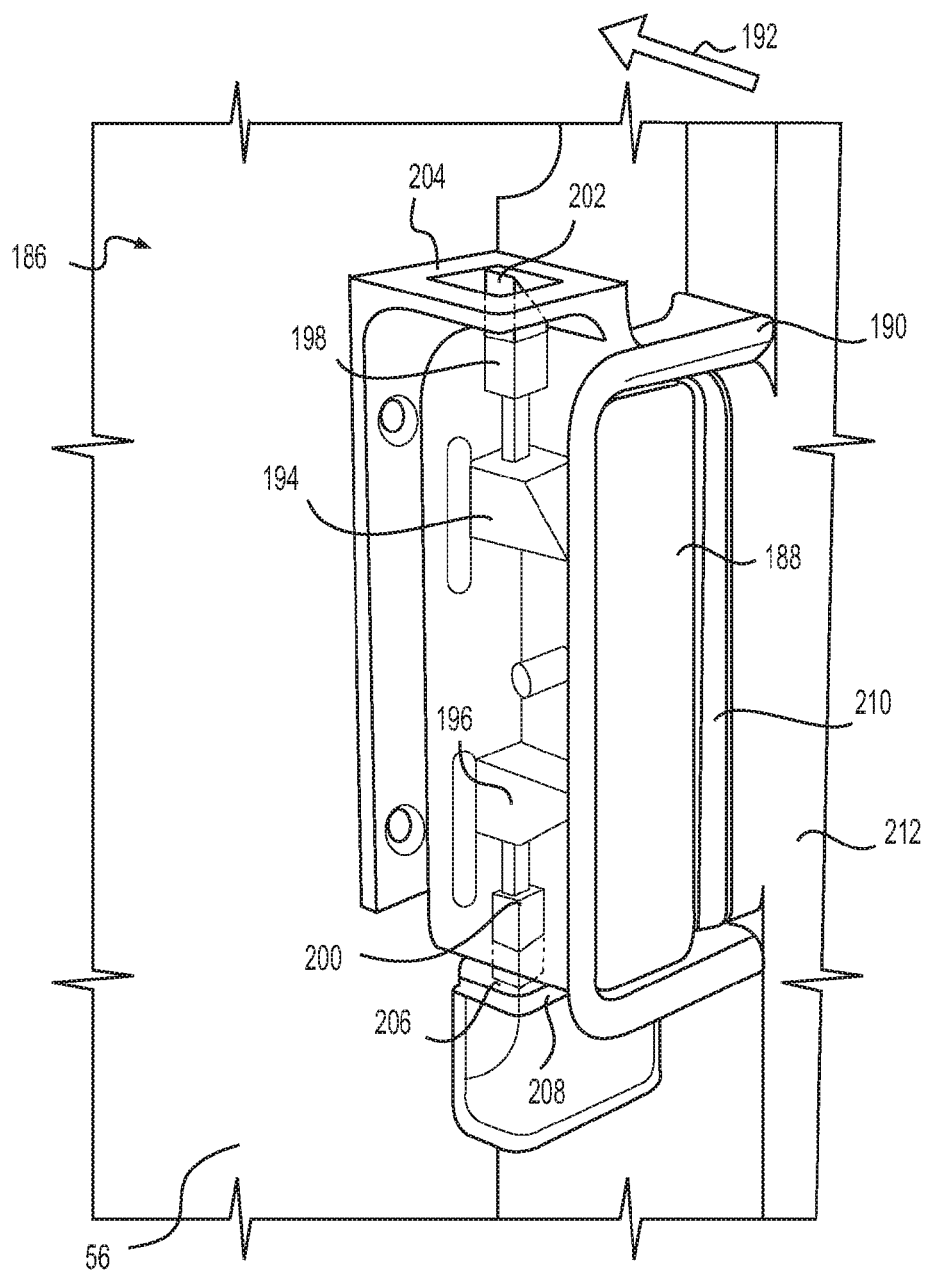
FIG. 9 is a perspective illustration of a latch mechanism contemplated for use in connection with the lavatory door according to the present invention, the latch mechanism being shown when the door is in the stowed condition.
Figure 10:
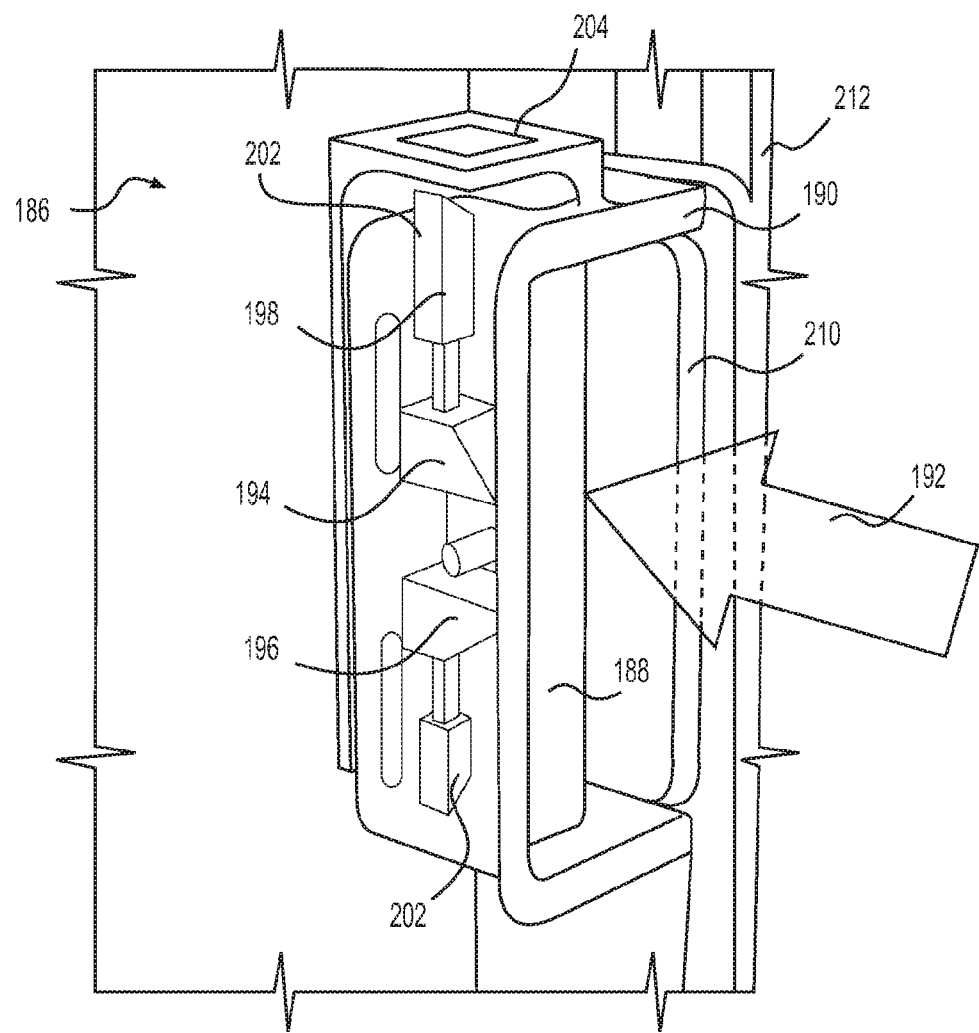
FIG. 10 is a perspective illustration of the latch mechanism illustrated in FIG. 9, after the pressure plate has been depressed, but prior to deployment of the door of the present invention.
Figure 11:
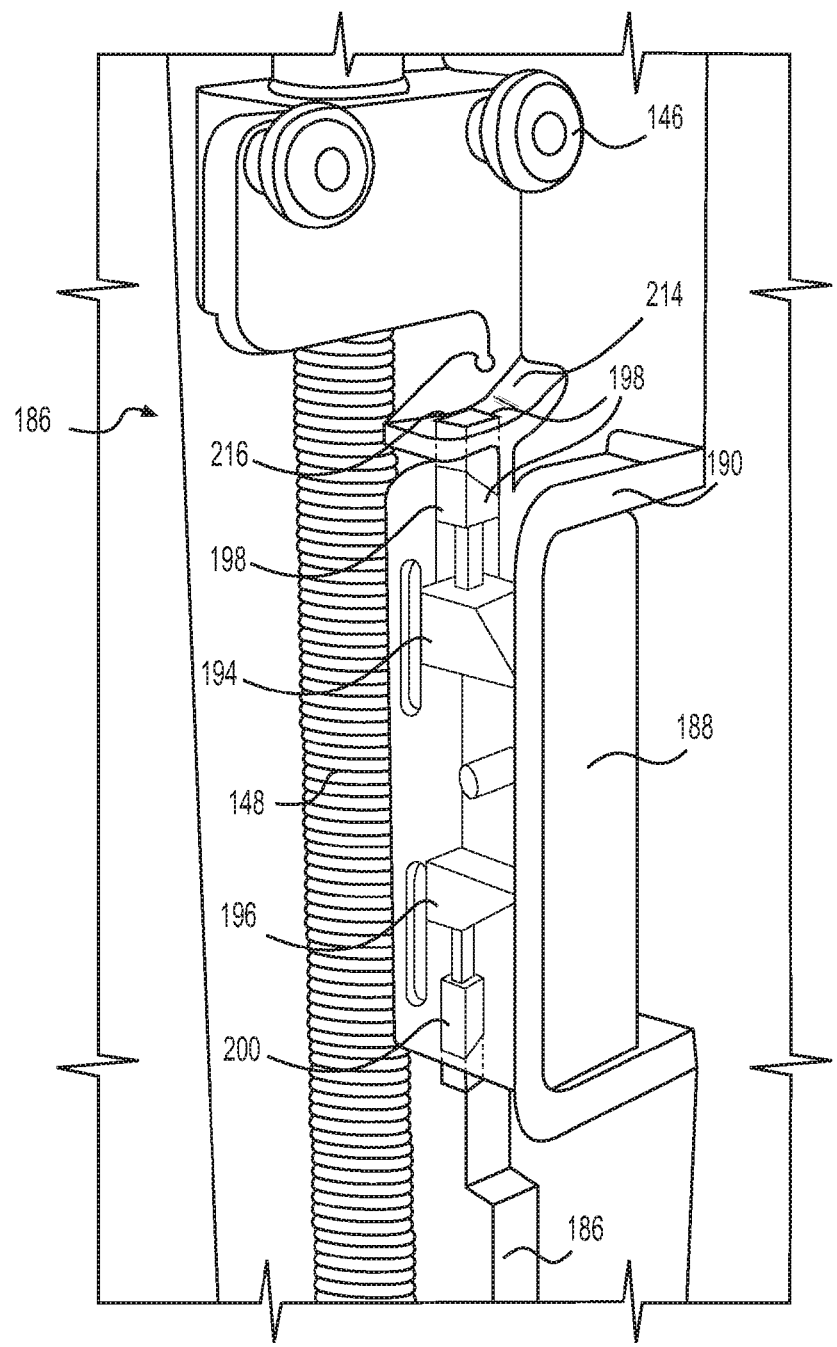
FIG. 11 is a perspective illustration of the latch mechanism shown in FIGS. 9 and 10, after the door has been deployed.

Reference is now made to FIGS. 9-11, which illustrate one embodiment of a latch mechanism 186 according to the present invention. The latch mechanism 186 described and illustrated is but one possible embodiment of a latch mechanism 186 that may be employed in connection with the door 50 of the present invention.

The latch mechanism 186 is contemplated to remain fixedly attached to the left bulkhead wall 56. As such, the latch mechanism 186 does not deploy with the door 50 from the left bulkhead 56.

In FIG. 9, the latch mechanism 186 is shown in a condition where the door 50 is stowed in the left bulkhead wall 56. In this position, the latch mechanism 186 retains the door 50 in the stowed condition until the latch mechanism 186 is activated.

The latch mechanism 186 includes a pressure plate 188 movably disposed within a U-shaped housing 190. The pressure plate 188 is contemplated to be actuated by a passenger to permit the passenger to deploy and possibly stow the door 50. To activate the pressure plate 188, the passenger presses on the pressure plate 188, thereby moving the pressure plate 188 in the direction of the arrow 192.

The pressure plate 188 is operably connected to an upper slide 194 and a lower slide 196. The upper slide 194 and the lower slide 196 are operative to slide toward one another when the pressure plate 188 is depressed.

As illustrated in FIG. 9, the upper slide 194 connects to an upper bolt 198. Similarly, the lower slide 196 connects to a lower bolt 200. The tip of the upper bolt 198 engages a detent (or hole) 202 in an upper plate 204. Similarly, the tip of the lower bolt 200 engages a detent (or hole) 206 in a lower plate 208. The upper plate 204 is contemplated to be connected to an intermediate plate 210, which forms the fourth wall of the housing of the latch mechanism 186 when the door 50 is stowed. The lower plate 208 is contemplated to be retracted into the left bulkhead wall 56 when disengaged. A decorative panel 212 covers the intermediate plate 210 (and the door 50) when the door is in the stowed position. The decorative panel 212 is contemplated to extend the full height of the left bulkhead wall 56.

With reference to FIG. 10, this illustration shows the state of the latch mechanism 186 immediately after the pressure plate 188 has been depressed. As a result, the upper bolt 198 disengages from the upper plate 204. Similarly, the lower bolt 200 disengages from the lower plate 208. Once disengaged, the passenger may apply pressure to the intermediate plate 210 to deploy the door 50 from the left bulkhead wall 56. While the door is deployed, the lower plate 208 retracts into a stowed position within the left bulkhead wall 56.

When the door 50 reaches the fully deployed position, the carriage 108 has moved to a position in proximity to the housing 190. The carriage 108 includes a detent plate 214 with a detent (or hole) 216 therein. The detent plate 214 engages the upper bolt 198. As a result, the carriage 108 becomes locked into place via the upper bolt 198. This locks the door 50 in the deployed position.

When the passenger wishes to open the door 50 (or return the door 50 to the stowed position), the passenger merely presses on the pressure plate 188. The application of pressure to the pressure plate 188 disengages the upper bolt 198 from the detent 216. Since the door 50 is biased to the stowed position by the winding spool 148, as discussed above, the door 50 automatically retracts to the stowed position. The upper and lower bolts 198, 200 then re-engage the upper and lower plates 204, 206 to retain the door 50 in the stowed position.

FIGS. 12-18 illustrate a second contemplated embodiment of a lavatory door 220 according to the present invention. Where appropriate, the same reference numerals are employed to refer to equivalent structures in the lavatory door 220. The use of the same reference numbers, however, should not be understood to mean that the identified elements in the two embodiments of the lavatory door 12, 220 are exactly the same.

The second embodiment of the lavatory door 220 shares many similarities with the first embodiment of the lavatory door 12, described above. Broadly defined, the lavatory door 220 includes a frangible door element 222 and a mechanism 224. The mechanism 224 is enclosed within the left bulkhead wall 226. The door element 222 extends between the left bulkhead wall 226 and a right bulkhead wall 228, shown in dotted line format.

Similar to the frangible door element 50, the frangible door element 222 includes a top panel 230, a center panel 232, and a bottom panel 234. The top panel 230 in this embodiment differs from the top panel 58 in the prior embodiment in its shape. In particular, the top panel 230 does not include a cutout 76 as with the door 50. The cutout 76 is not needed because the door 222 does not include an emergency release handle 78 as in the prior embodiment.

In the second embodiment, the door element 222 is frangible, just as in the first embodiment of the door element 50. However, in this embodiment, an emergency release handle 78 is not needed to initiate the segmentation of the door element 222. In this second embodiment, the application of pressure on either side of the door element 222 is sufficient to initiate segmentation of the door element 222. In other words, a release action, such as when a person applies more than a predetermined amount of force to either side of the door element 222, the tension cables 244, 246, 248 will release their tension and the door element 222 will segment into individual slats 236, 238, 240, 242, just as with the door element 50.

Figure 13:
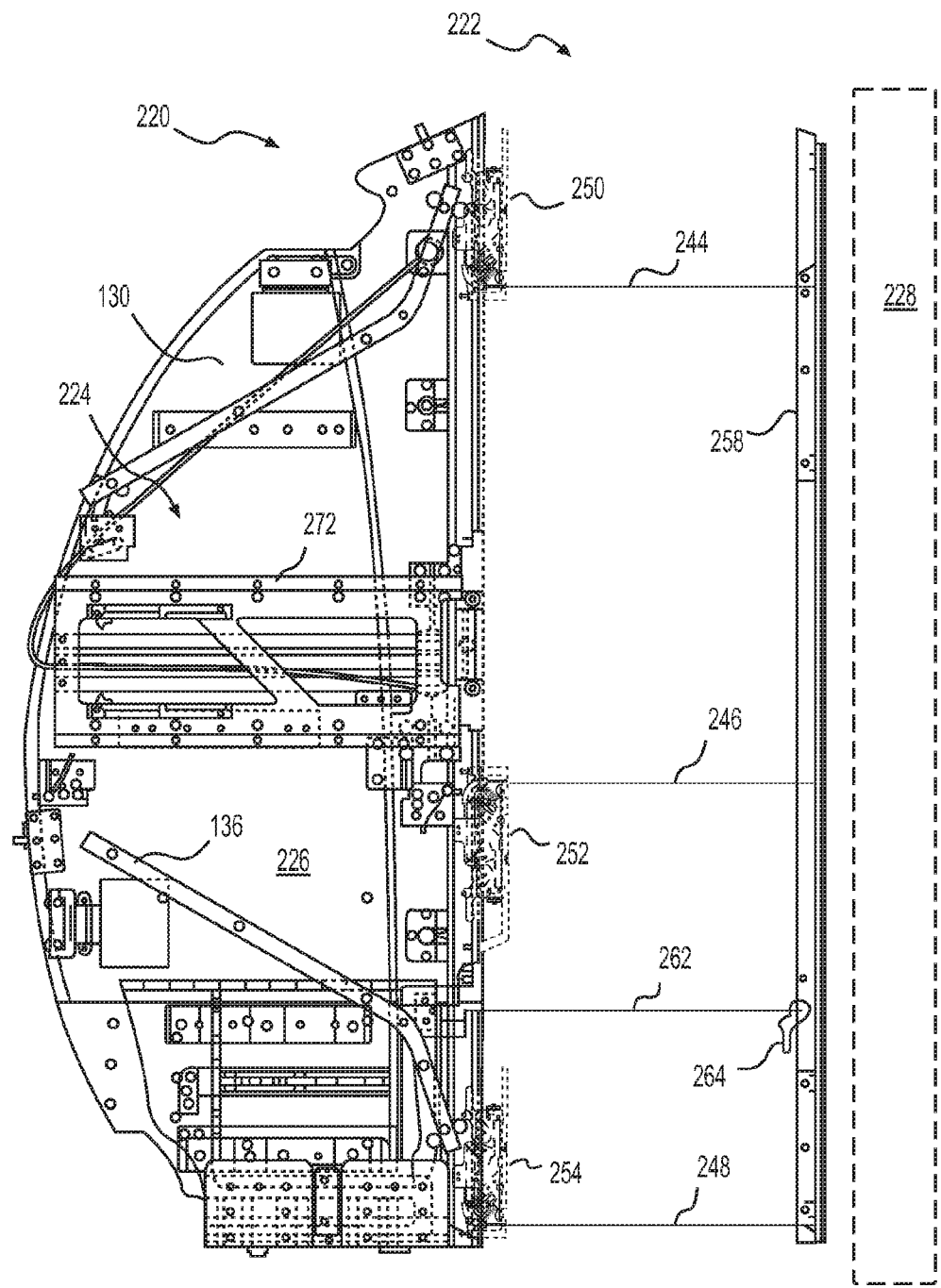
FIG. 13 is a partial, front, elevational view of the lavatory door illustrated in FIG. 12, showing aspects of the invention with the door element removed.

Just as with the door element 50, the door element 222 includes a top tension cable 244, a center tension cable 246, and a bottom tension cable 248, which are shown in FIG. 13 without the door panels or slats 236, 238, 240, 242. The three tension cables 244, 246, 248 are each connected to a resettable tensioner 250, 252, 254. In particular, the top tension cable 244 connects to the top resettable tensioner 250. The center tension cable 246 connects to the center resettable tensioner 252. The bottom tension cable 248 connects to the bottom resettable tensioner 254.

The slat 236 includes a left track 256 at the edge closest to the left bulkhead wall 226. Similarly, the slat 242 includes a right track 258 at the edge closest to the right bulkhead wall 228. This construction parallels the construction of the door element 50. The resettable tensioners 250, 252, 254 are attached to the left track 256. The tension cables 244, 246, 248 connect between the resettable tensioners 250, 252, 254 and the right track 258.

The door element 222 also includes a door tensioner release mechanism 260 connected to the left track 256. The operation of the door tensioner release mechanism 260 is discussed in greater detail below. The door tensioner release mechanism 260 connects to a tension release cable 262 that extends from the door tensioner release mechanism 260 and the right track 258. In the illustrated embodiment, the tension release cable 262 is positioned between the center tension cable 246 and the bottom tension cable 248. As illustrated, the tension release cable 262 connects to a lever 264 that is connected to the right track 258. The lever 264 may be operated manually to release the tension in the tension release cable 262 and/or to actuate manually the door tensioner release mechanism 260.

In the embodiment of the door 220, and as discussed in greater detail below, when a person presses against the door element 222 and exceeds a predetermined pressure, the force applied on the tension release cable 262 will activate the door tensioner release mechanism 260. As illustrated in detail in FIG. 16, the door tensioner release mechanism 260 is connected via three actuation cables 266, 268, 270 to the resettable tensioners 250, 252, 254. As a result, when a suitable force is applied to the tension release cable 262, the resettable tensioners 250, 252, 254 are actuated to release the tension on the tension cables 244, 246, 248, thereby permitting the door element 222 to fragment.

FIG. 13 is a further depiction of the door 220. In this illustration, the door 222 has been removed so that various features of the door 222 are more readily visible.

Figure 14:
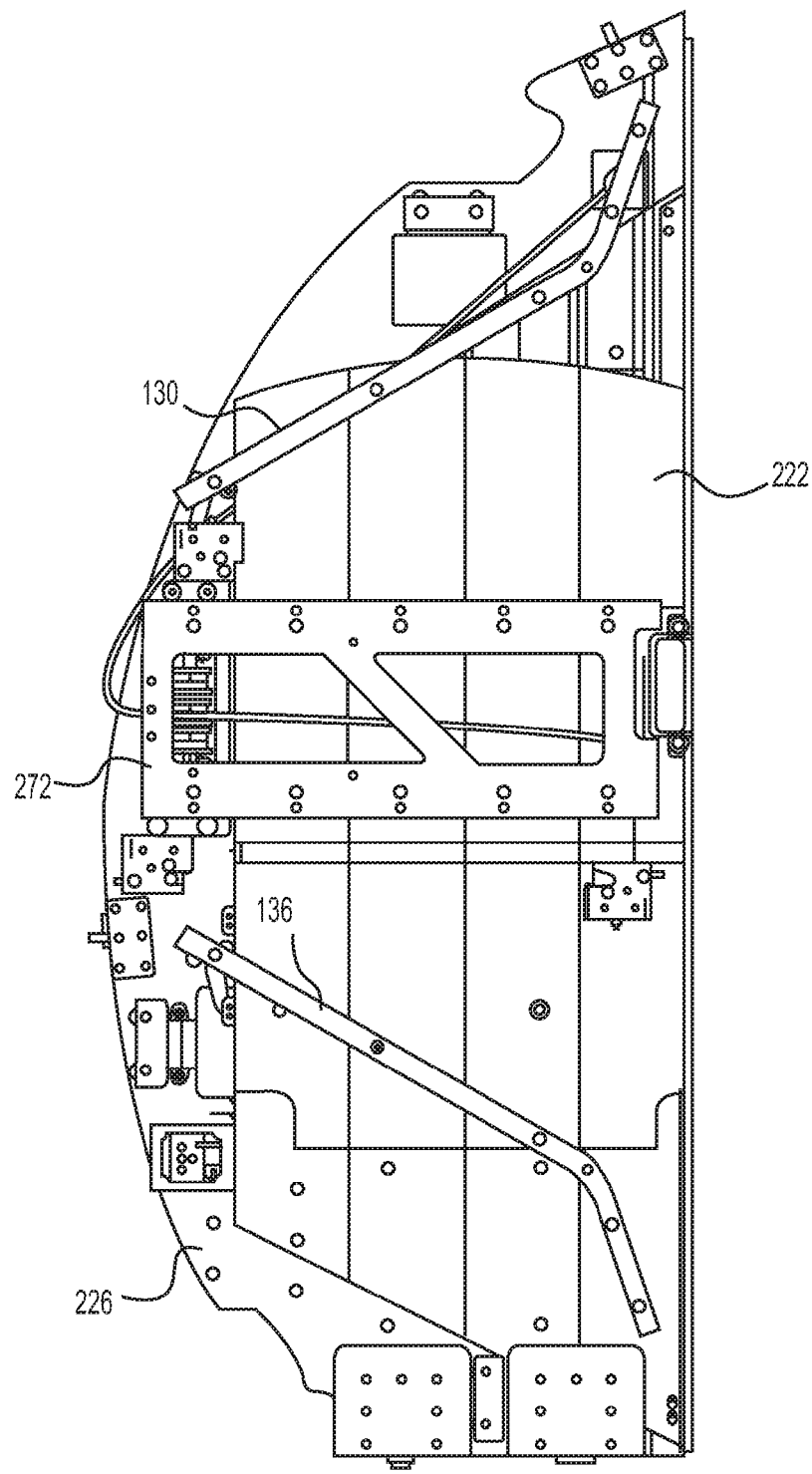
FIG. 14 is a partial, front, elevational view of the lavatory door illustrated in FIG. 12, showing the lavatory door in a stowed condition within the bulkhead wall.

FIG. 14 illustrates the door element 222 in the stowed position. As before, the door element 222 is collapsed with respect to the deployed position illustrated in FIG. 12. In addition, the door element 222 is stowed within the left bulkhead wall 226. It is noted that the orientation of the door element 222 with respect to the left bulkhead wall 226 and the right bulkhead wall 228 is merely exemplary. The door element 222 may be actuated from the right bulkhead wall 228 without departing from the scope of the present invention.

Figure 12:
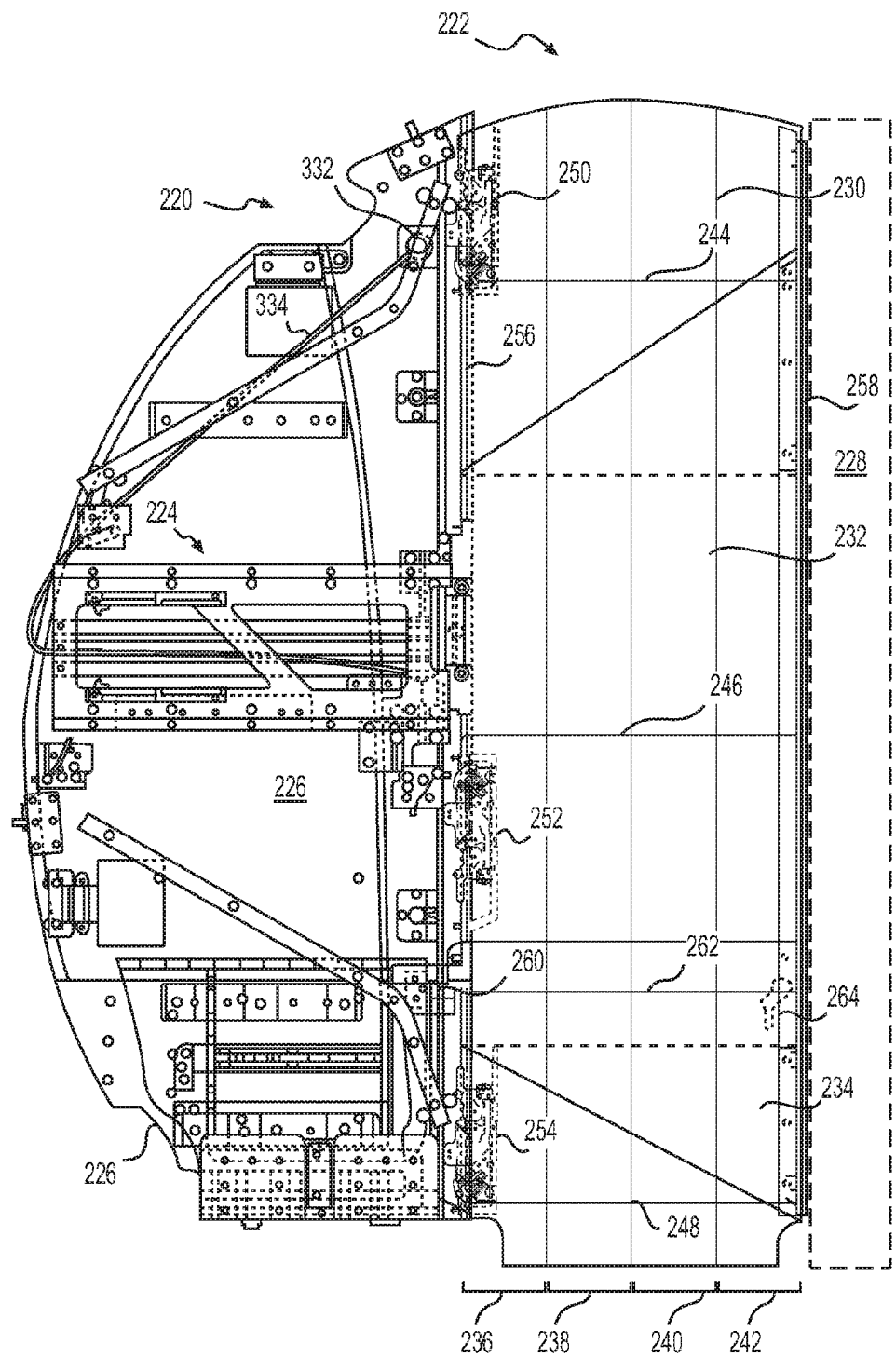
FIG. 12 is a front, elevational view of a second contemplated embodiment of the lavatory door of the present invention, also showing aspects of the mechanisms associated therewith, the lavatory door being illustrated in a deployed, assembled condition.

With reference to FIGS. 12 and 13, the construction of the mechanism 224 also differs from the construction of the mechanism 52 discussed in connection with the first embodiment of the door 12. In the second embodiment of the lavatory door 220, the mechanism 224 includes a carriage 272 that is considered to be more robust than the mechanism 52 discussed above.

Figure 15:
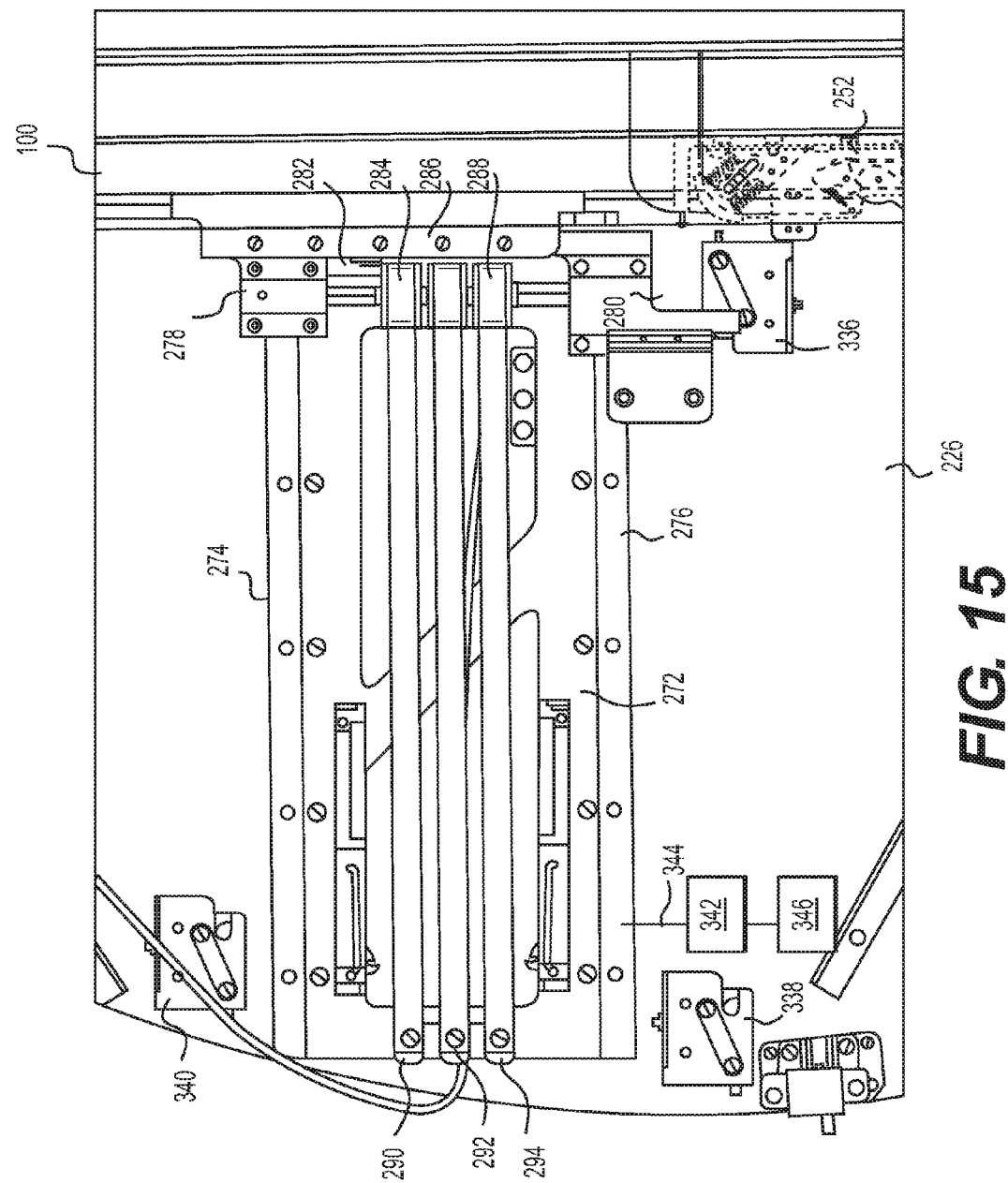
FIG. 15 is an enlarged detail of a portion of the mechanism that facilitates the transition of the lavatory door illustrated in FIG. 12 between the deployed and stowed conditions.

As illustrated in FIG. 15, the carriage 272 includes an upper track 274 and a lower track 276. An upper bearing plate 278 travels along the upper track 274, and a lower bearing plate 280 travels along the lower track 276. A bearing slider mechanism 282 extends between the upper bearing plate 278 and the lower bearing plate 280. Three constant torque springs 284, 286, 288 are disposed on the bearing slider mechanism 282. Three straps 290, 292, 294 extend from the constant torque springs 290, 292, 294 to the carriage 272.

The constant torque springs 284, 286, 288 are contemplated to exert a constant (or substantially constant force on the bearing slider mechanism 282 in its travel along the carrier 272. Since the bearing slider mechanism 282 is connected to the door element 222, this constant (or substantially constant) force is applied to the door element 222 as it transitions from the deployed condition to the stowed condition. The operation of the constant torque springs 284, 286, 288, therefore, provides for a smooth transition of the door element 222 between the deployed and the stowed conditions.

The straps 290, 292, 294 are contemplated to roll up onto the constant torque springs 284, 286, 288, as illustrated. The straps 290, 292, 294, therefore, are contemplated to be made from a suitable material that is easily rolled and unrolled from the spooling surfaces associated with the constant torque springs 284, 286, 288.

Figure 16:
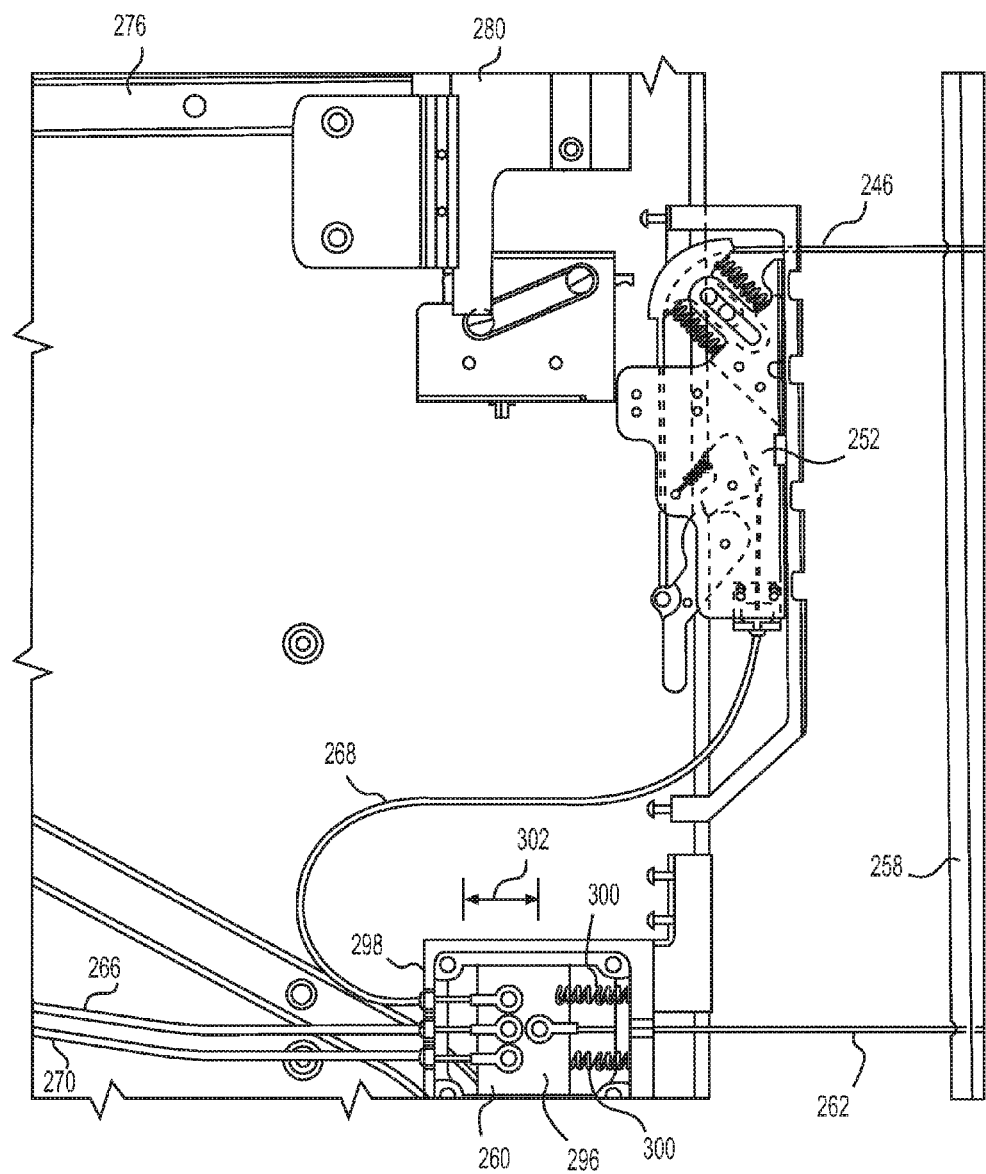
FIG. 16 is an enlarged detail of a resettable tensioner and a door tensioner release mechanism that permits the lavatory door illustrated in FIG. 12 to transition between the assembled condition and the fragmented condition, the resettable tensioner and door tensioner release mechanism being shown in the tensioned condition.

With renewed reference to FIG. 16, the door tensioner release mechanism 260 includes an internal slider 296 that is disposed within a housing 298. The slider 296 is biased via one or more springs 300 against movement within the housing 298. As should be apparent, when a person presses on the door element 222, force is applied to the tension release cable 262 that pulls on the slider 296 in a direction against the forces applied by the springs 300. As noted above, once a predetermined amount of force is applied to the door element 222, the slider 296 will be pulled a sufficient distance 302 within the housing that the cables 266, 268, 270 will release the resettable tensioners 252, 254, 256. This, in turn, releases the tension on the cables 244, 246, 248, thereby permitting the door element 222 to transition to the segmented condition.

Figure 17:
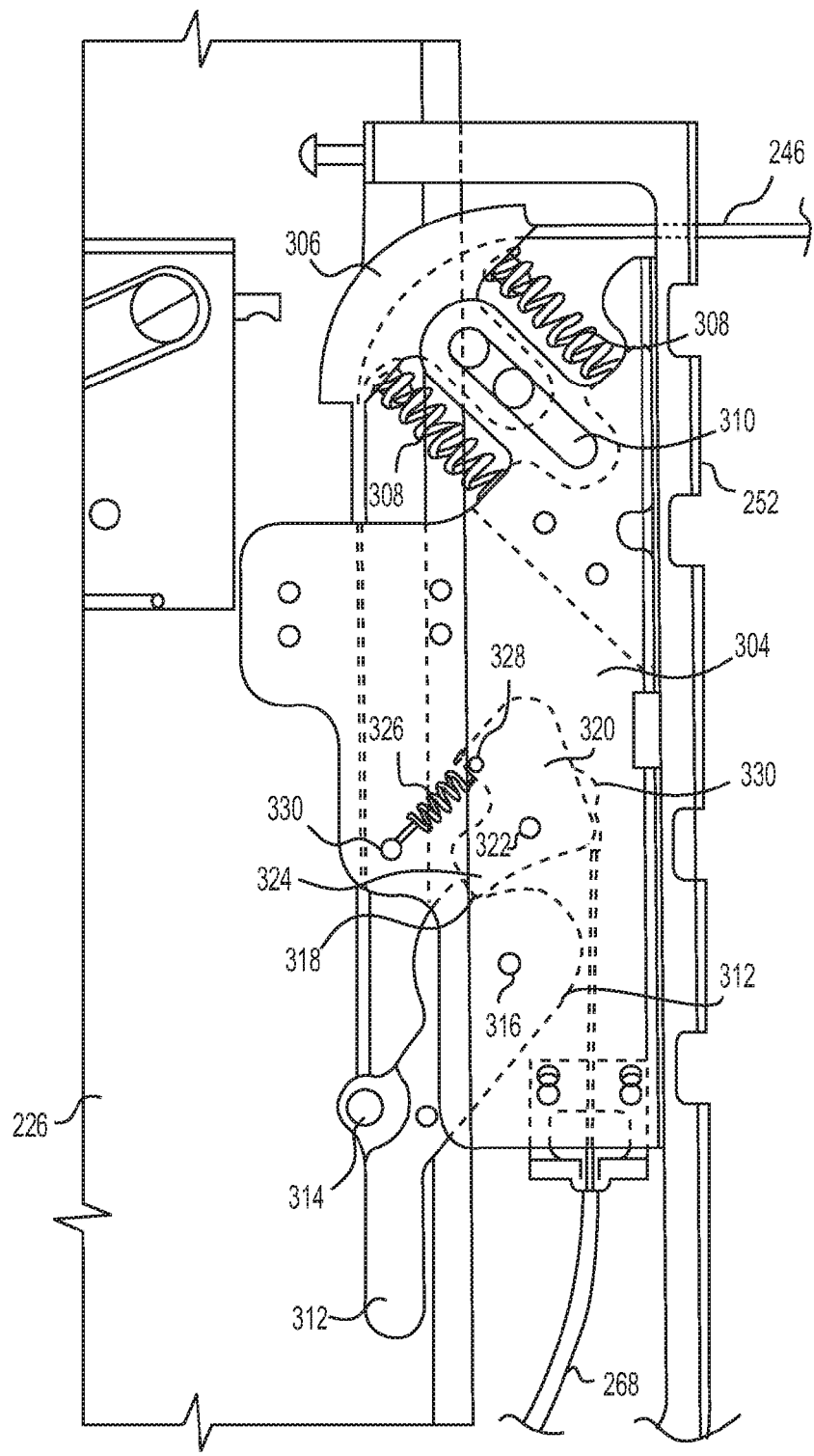
FIG. 17 is an enlarged detail of the resettable tensioner illustrated in FIG. 16, with the resettable tensioner being shown in the tensioned condition.

FIG. 17 is an enlarged detail of the resettable tensioner 252. The resettable tensioner 252 is contemplated to operate similarly to the resettable tensioners 250, 254.

The resettable tensioner 252 includes a housing 304 that is attached to the left track 256 on the door element 222. The housing 304 contains a tensioner 306 that is slidably attached to the housing 304 via two springs 308. The tensioner 306 applies tension to the cable 246 to maintain the door element 222 in the assembled condition. The tensioner 306 slides within a groove 310, as illustrated.

The cable 246 extends from the door element 222, over the tensioner 306, to a lever 312. As illustrated in FIG. 17, the cable 246 connects to the lever 312 at a connection point 314. The lever 312, in turn, is rotatably mounted in the housing 304 at a lever pivot 316. The lever 312 includes a lever detent 318 that interacts with an actuator 320. The actuator 320 is rotatably mounted in the housing 304 at an actuator pivot 322. The actuator includes an actuator detent 324 that cooperates with the lever detent 318, as described below. The actuator 320 also connects to the housing 304 by a spring 326. The spring 326 connects between a connection point 328 on the actuator 320 and a connection point 329 on the housing 304. The cable 268 connects to the actuator 320 at a connection point 330.

Figure 18:
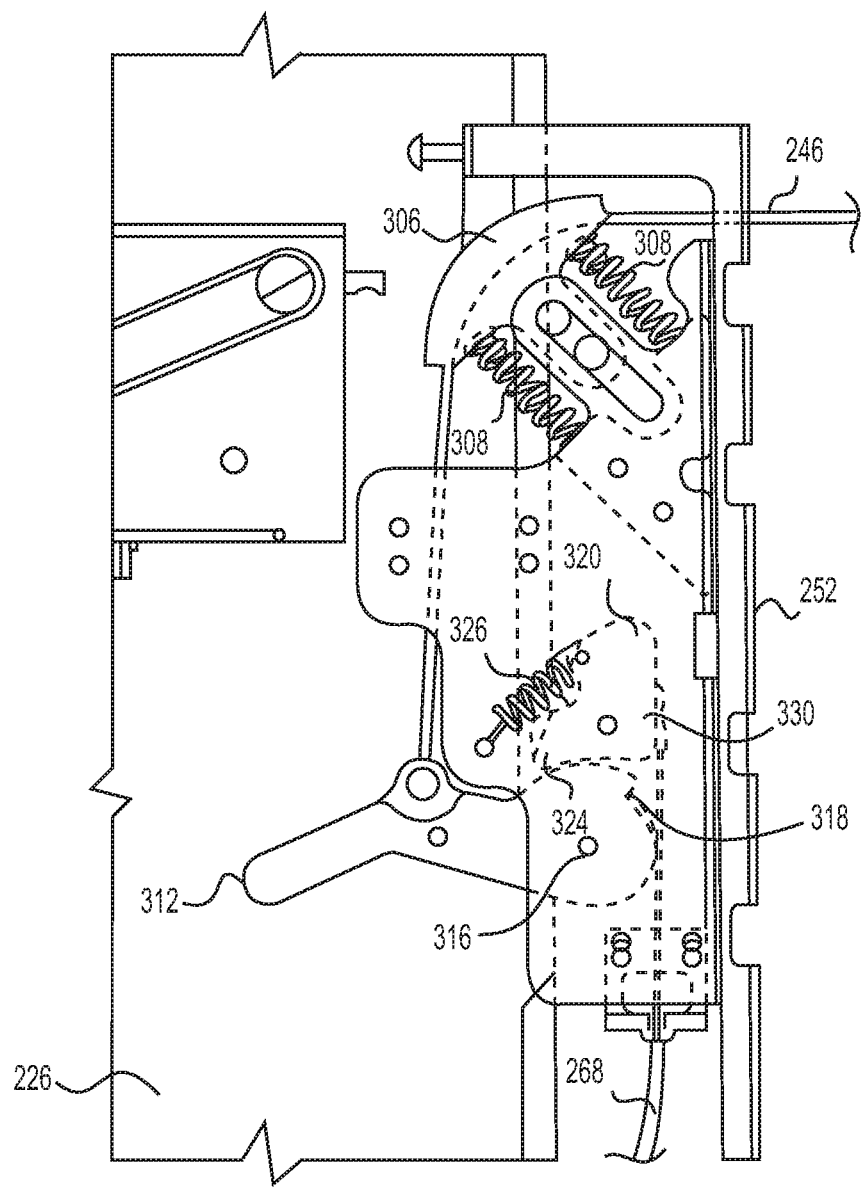
FIG. 18 is an enlarged detail of the resettable tensioner illustrated in FIG. 16, with the resettable tensioner being shown in the released condition.

FIG. 18 is an enlarged detail of the resettable tensioner 252. In this drawing, the resettable tensioner 252 is in the released condition. As indicated above, in FIG. 17, the resettable tensioner 252 is shown in the tensioned condition.

When a passenger applies pressure to one side of the door element 222 to force the door element 222 to transition from the assembled condition to the segmented condition, a force is applied to the cable 268 (via the door tensioner release mechanism 260). The cable 268 pulls on the actuator 320, thereby rotating the actuator 320. Rotation of the actuator 320 causes the actuator detent 324 to disengage from the lever detent 318, thereby releasing the tension on the cable 246. At this point, the door element 222 becomes segmented, as described above.

To reset the door element 222, a person need only press on the lever 312 until the lever detent 318 re-engages the actuator detent 324. At this point tension is applied to the cable 246 and the door element 222 is restored to an assembled condition. It is noted that all three resettable door tensioners 250, 252, 254 are contemplated to be operated together to facilitate transition of the door element 222 from the assembled condition to the segmented condition and back again.

As should be apparent from the foregoing, the door tensioner release mechanism 260 is operating similarly to the cable interlock 116 provided with the door 12. As should be apparent, the emergency release handle 78 operates by a pulling motion thereon. This is similar to the operation of the door tensioner release mechanism 260, which also responds to a tension (or pulling motion) on the tension release cable 262.

With respect to the lavatory door 12, it is noted that the cable interlock 116, the emergency tension release cable 106, and optionally, the emergency release handle 78 cooperate to form an emergency release. With respect to the lavatory door 220, the door tensioner release mechanism 260 and the tension release cable 262 cooperate to form an emergency release, wherein the occurrence of a release action (such as a force applied to the door 220) causes the tensioners 250, 252, 254 to release the tension in the tensioning cables 244, 246 and 262. As should be apparent, therefore, the embodiment of the emergency release for the second embodiment of the lavatory door 220 excludes at least the emergency release handle 78.

Similarly, the actuator 320 operates akin to the release 174. The lever 312 operates similarly to the cam 166. The tensioner 306 operates akin to the pulley 156. The detents 318, 324 operate similarly to the lips 170, 172. Accordingly, the actuator 320 also is referred to as a release 320. The lever 312 also is referred to as a cam 312. The detents 318, 324 also are referred to as lips 318, 324. The pulley 156 also is referred to as a tensioner 156. With these common appellations, the tensioners 124, 252 are considered to be variants of one another.

With renewed reference to FIG. 12, the door 220 also includes an emergency release button 332 that connects to the door element 222 via a cable 334. The emergency release button 332 is contemplated to be provided as a back-up to the operation of the emergency release 260.

With renewed reference to FIG. 15, three rotary latches 336, 338, 340 are illustrated. The rotary latches 336, 338, 340 are disposed within the left bulkhead wall 226. The rotary latches 336, 338, 340 help to secure the door element 222 when in the stowed condition.

FIG. 15 also illustrates a switch 342 that is connected to the door 220 via a communication line 344. The switch 342 is contemplated to provide an electrical signal to indicate the condition of the door element 222. In particular, the switch 342 is contemplated to generate a signal that indicates if the door element 222 is in the deployed or stowed condition. As should be apparent, the switch 342 is illustrated graphically. The exact construction and operation of the switch 342 is not critical to the present invention.

The switch 342 (or sensor 342) is provided so that the condition of the door element 222 may be provided to the pilot, co-pilot, flight attendant, or other personnel on board the aircraft 10. It is contemplated that the signal from the switch 342 may be relied upon for purposes of determining if the aircraft 10 is in a condition for taxi, take-off, and landing (or "TTL"). As may be apparent, it is contemplated that the door element 222 will need to be in the stowed condition for TTL. The switch 342 is contemplated to provide a simple indication of the stowed condition of the door element 222 at a remote location. For example, the switch 342 may cause a light indicator to be illuminated in the flight deck area so that the flight crew is aware that the door element 222 is properly stowed for TTL.

In addition, it is contemplated that the switch 342 may be incorporated into an automated system that causes the door element 222 to return to the stowed position under certain, predetermined conditions. For example, as the aircraft 10 is approaching a runway for landing, a signal may be generated to the switch 342 to cause the door element 222 to be stowed automatically.

In this arrangement, it is contemplated that stowage of the door element 222 may be triggered when the flight management system 346 (cabin management system or other automated system) on the aircraft 10 detects certain flight conditions. For example, if the control surfaces on the wings 24, 26 (i.e., the flap positions) are at a predetermined angle, this suggests that the aircraft 10 is in a TTL mode of operation. As such, a signal may be issued from the system 346 to the switch 342 to cause the door element 222 to automatically return to the stowed condition. Other triggering conditions include, but are not limited to, a parameter referred to as "weight on wheels" (or "WOW"). When the aircraft 10 is WOW, this indicates that the aircraft 10 is on the ground and has its weight on the landing gear wheels. Stowage of the door element 222 may also be triggered on the basis of cabin conditions detected by the cabin management system, such as when the seat belt sign is activated, for example.

As may be apparent, there are a number of triggering conditions that may be employed, either alone or together, to cause the door element 222 to be automatically stowed. Moreover, the system controlling the door element 222 may include one or more locking elements, which may be actuated by solenoids, to lock the door element 222 in the stowed position until after the aircraft 10 transitions from a TTL mode of operation.

Figure 19:
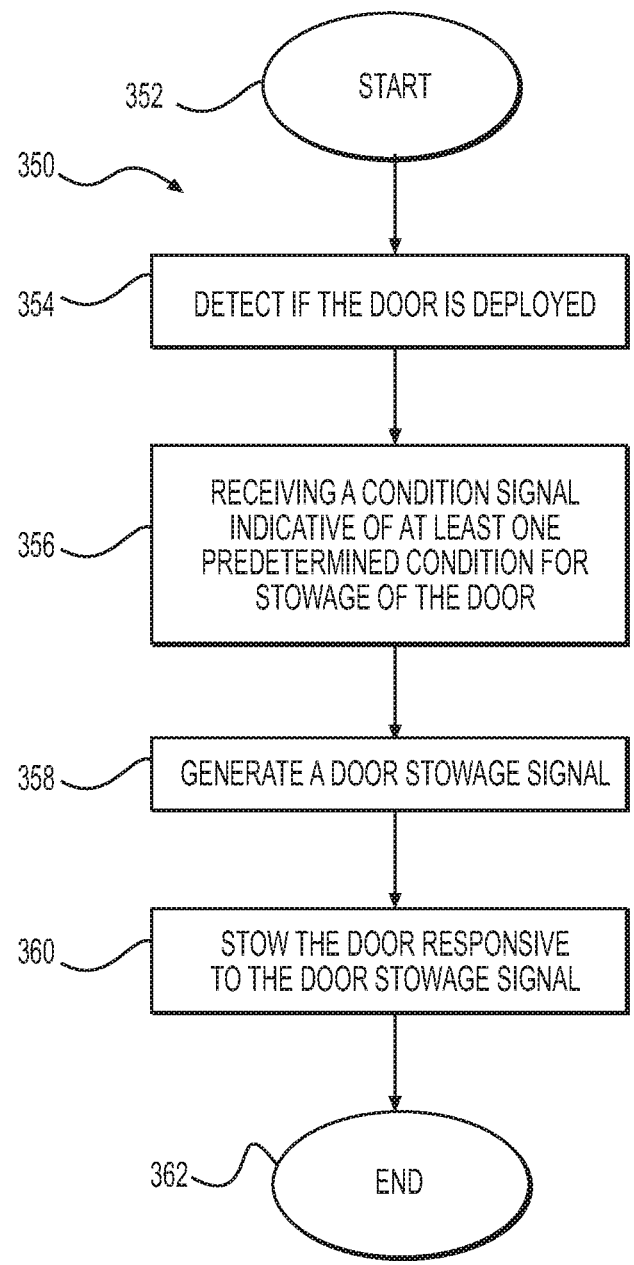
FIG. 19 is a flow chart illustrating one contemplated method of operation of the door of the present invention.

In connection with the automatic stowage of the door element 50, 222, one contemplated method of operation 350 is illustrated in FIG. 19. Method 350 may be a computer implemented method in which instructions for carrying out the method steps disclosed herein may be embodied as computer program products. For example, a computer program product for assisting with automatic stowage of the door element 50, 222 may comprise a non-transitory computer readable storage medium having program code embodied therewith. The program code may be readable/executable a processor or other logic circuit.

The method 350 starts at 352. The method proceeds to step 354, where there is a detection if the door 12, 220 is in the deployed position. The detection may be made via the switch or sensor 342, for example. As should be apparent to those skilled in the art, there are any number of ways to detect if the door 12, 220 is in the deployed condition. The present invention is not considered to be limited to any particular embodiment or variation of a detector, sensor, switch, or the like. A signal indicative that the door 12, 220 is in the deployed position may be sent from the switch or sensor 342 to a processing entity, such as the flight management computer, among other possibilities.

The processing entity may comprise one or more processors and computer-readable memory(ies)/medium(ia) containing instructions readable and executable by the processor. The processor may for example, comprise or be part of one or more digital computer(s) or other data processors or other suitably programmed or programmable logic circuits. The processor may comprise general purpose computer(s), special purpose computer(s), or other programmable data processing apparatus, and may be configured for use onboard the aircraft.

The memory or memories may comprise any combination of one or more suitable computer readable medium(ia). The computer readable medium may be a non-transitory computer readable storage medium. Such non-transitory computer readable storage medium may comprise, for example, but not limited to, an electronic, magnetic, optical, electro-magnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer-readable storage medium may be any tangible medium that can contain, or store instructions for use by or in connection with an instruction execution system, apparatus, or device such as the processor described above.

After detecting that the door 12, 220 is in the deployed position at step 354, the method 350 proceeds to step 356. At step 356, the method 350 comprises receiving a condition signal indicative of at least one predetermined condition for stowage of the door. It is contemplated that, at this step, the condition signal is received at a suitable processor (such as the flight management system 346) indicative that the door 12, 220 should be stowed. Condition signals include, but are not limited to, flap position, weight on wheels, "fasten seat belt" signal, etc., as discussed above. Condition signals may be received from any system on board the aircraft 10, as should be apparent from the foregoing.

At step 358, having detected that the door 12, 220 is in the deployed condition and having received a condition signal indicative of a predetermined condition for stowage of the door 12, 220, a door stowage signal is generated. The door stowage signal may be generated by a suitable processor, such as that described above, upon detection of the door 12, 220 being in the deployed position and occurrence of the predetermined condition. Alternatively, the door stowage signal may be generated upon input by a pilot who has received an indication that the door 12, 220 is deployed and that a predetermined condition has occurred. The door stowage signal may then be issued from the processor to associated elements that assist with the stowage of the door 12, 220. For example, it is contemplated that the door stowage signal may activate an element that releases the door 12, 220 from the deployed position. The door 12, 220 is then expected to return to the stowage position as a default position.

At step 360, the door 12, 220 is stowed in response to the door stowage signal. In the embodiments described herein, the door 12, 220 is contemplated to return to the stowed condition as a result of the forces applied, for example, by the winding spool 148 or by the constant torque springs 284, 286, 288.

The method 350 ends at step 362.

As should be apparent, the method 350 may include a larger or a fewer number of steps without departing from the scope of the present invention. In addition, it is contemplated that the method will be executed by a suitable processor on board (or associated with the aircraft 10). As should be apparent, the method 350 may be incorporated into suitable software code and/or programmable memory or the like. The method 350 also may be hardwired into the operation of the aircraft 10, as required or as desired.

Various aspects of the present disclosure may be embodied as systems, methods and/or computer program products. Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in one or more non-transitory computer readable medium(ia) having computer readable program code (e.g., instructions) embodied thereon. The computer program product may, for example, be executable by data processors or other suitable logic circuit to cause the execution of one or more of the methods disclosed in the present disclosure in entirety or in part.

As noted above, the embodiment(s) described herein are intended to be exemplary of the wide breadth of the present invention. Variations and equivalents of the described embodiment(s) are intended to be encompassed by the present invention, as if described herein.

What is claimed is:

1. A door for an aircraft, comprising:
   a first panel divisible into at least two first slats that are releasably connected to one another;

a first tensioning cable attached between the at least two first slats; and a first tensioner connected to the first tensioning cable and operative to apply a first tension permitting the first tensioning cable to hold the at least two first slats together to form the first panel, and to release the first tension in the first tensioning cable upon occurrence of a release action permitting the at least two first slats to dissociate from one another so that the first panel fragments.

2. The door of claim 1, wherein the release action comprises the application of a sufficient force to the first panel.

3. The door of claim 1, further comprising an emergency release connected to the first tensioner, wherein the emergency release is responsive to the release action.

4. The door of claim 3, wherein the emergency release comprises at least a cable interlock connected to a tension release cable.

5. The door of claim 4, wherein the emergency release comprises at least a door tensioner release mechanism connected to the tension release cable.

6. The door of claim 1, further comprising:

a second panel slidably disposed adjacent to the first panel, the second panel divisible into at least two second slats that are releasably connected to one another;

a second tensioning cable attached between the at least two second slats; and a second tensioner connected to the second tensioning cable and operative to apply a second tension permitting the second tensioning cable to hold the at least two second slats together to form the second panel, and to release the second tension in the second tensioning cable upon occurrence of the release action permitting the at least two second slats to dissociate from one another so that the second panel fragments.

7. The door of claim 6, further comprising:

a third panel slidably disposed adjacent to the first panel, the third panel divisible into at least two third slats that are frangibly connected to one another;

a third tensioning cable attached between the at least two third slats; and a third tensioner connected to the third tensioning cable and operative to apply a third tension permitting the third tensioning cable to hold the at least two third slats together to form the third panel, and to release the third tension in the third tensioning cable upon occurrence of the release action permitting the at least two third slats to dissociate from one another so that the third panel fragments.

8. The door of claim 7, wherein the at least two first slats, the at least two second slats, and the at least two third slats each comprise at least four slats that are disposed adjacent to one another and are vertically aligned.

9. The door of claim 7, further comprising:

a carriage connected to the first panel; and a carriage frame adapted to be disposed in a bulkhead wall, the carriage frame slidably supporting the carriage so that the first panel is moveable between a stowed position within the bulkhead wall and a deployed position outside of the bulkhead wall.

10. The door of claim 9, wherein, when moving towards the deployed position:

the second panel slides upwardly with respect to the first panel to establish a top for the door; and the third panel slides downwardly with respect to the first panel to establish a bottom for the door.

11. The door of claim 1, wherein the first tensioner comprises:

a housing;

a cam rotatably disposed in the housing, the cam defining a cam lip; and a release rotatably disposed in the housing, the release defining a release lip;

wherein the cam lip and the release lip engage one another to maintain the door in an assembled condition, and wherein the cam lip and the release lip disengage from one another upon occurrence of the release action to cause the at least two first slats to be dissociated from one another.

12. The door of claim 11, wherein the first tensioner further comprises:

a cable tensioner engaging the first tensioning cable; and a first biasing element connected between the housing and the cable tensioner, wherein the first biasing element applies the first tension to the cable tensioner, which translates into the first tension on the first tensioning cable.

13. The door of claim 12, wherein the first tensioner further comprises:

a captive end attached to the first tensioning cable, the captive end engaging a detent defined in the cam; and a second biasing element connected between the housing and the release, the second biasing element biasing the release into engagement with the cam.

14. The door of claim 4, further comprising an emergency release handle connected to the tension release cable.

15. The door of claim 9, wherein the carriage comprises a biasing mechanism for biasing the door in the stowed position.

16. The door of claim 15, wherein the biasing mechanism comprises at least one of a winding spool and a constant torque spring, for biasing the door in the stowed position.

17. The door of claim 1, wherein the first panel is stowable in a bulkhead wall in response to at least one predetermined condition.

18. The door of claim 17, wherein the at least one predetermined condition comprises at least one selected from a group comprising flight conditions and cabin conditions.

19. The door of claim 1, further comprising a latch, wherein the latch comprises:

a pressure plate;

a first bolt operatively connected to the pressure plate;

an intermediate plate connected to the first panel; and a first detent plate connected to the intermediate plate, the first detent plate releasably engaging the first bolt;

wherein application of pressure to the pressure plate dislodges the first bolt from the first detent plate permitting the door to be deployed from a stowed position.

* * * * *